United States Patent
Tateishi

(10) Patent No.: US 8,103,365 B2
(45) Date of Patent: Jan. 24, 2012

(54) METHOD AND DEVICE FOR CONTROLLING EQUIPMENT BASED ON MULTIPLE-INPUT/ONE-OUTPUT CONTROL

(75) Inventor: Masahiko Tateishi, Nagoya (JP)

(73) Assignee: Denso Corporation, Kariya (JP)

( * ) Notice: Subject to any disclaimer, the term of this patent is extended or adjusted under 35 U.S.C. 154(b) by 334 days.

(21) Appl. No.: 12/184,538

(22) Filed: Aug. 1, 2008

(65) Prior Publication Data

US 2009/0037002 A1 Feb. 5, 2009

(30) Foreign Application Priority Data

Aug. 1, 2007 (JP) ................................. 2007-201078
Mar. 26, 2008 (JP) ................................. 2008-080925

(51) Int. Cl.
*G05B 13/02* (2006.01)
*B60H 1/00* (2006.01)
*F24F 7/00* (2006.01)
(52) U.S. Cl. ........................... 700/31; 165/203; 236/49.3
(58) Field of Classification Search .................... 700/31; 345/646; 165/203; 236/49.3
See application file for complete search history.

(56) References Cited

U.S. PATENT DOCUMENTS

| | | | | |
|---|---|---|---|---|
| 5,199,485 A | * | 4/1993 | Ito et al. | 165/203 |
| 5,933,527 A | * | 8/1999 | Ishikawa | 382/190 |
| 6,353,434 B1 | * | 3/2002 | Akebi et al. | 345/173 |
| 6,827,284 B2 | * | 12/2004 | Ichishi et al. | 236/49.3 |
| 7,703,839 B2 | * | 4/2010 | McKnight et al. | 296/180.5 |
| 2007/0131782 A1 | * | 6/2007 | Ziehr et al. | 236/1 B |

FOREIGN PATENT DOCUMENTS

JP 2002008055 * 1/2002

OTHER PUBLICATIONS

Lee et al.; "Polymorph: Morphing Among Multiple Images"; IEEE Computer Graphics and Applications; Jan./Feb. 1998; pp. 60-73.
"3-2-2 2D, 3D Effects (1)" Japan patent Office Home Page; 21 pages http://www.jpo.go.jp/shiryou/s_sonota/hyoujun_gijutsu/nle/nle-3-2-2-a.html with partial English translation.

* cited by examiner

*Primary Examiner* — Kakali Chaki
*Assistant Examiner* — Sivalingam Sivanesan
(74) *Attorney, Agent, or Firm* — Nixon & Vanderhye P.C.

(57) ABSTRACT

Combined control patterns corresponding to the actual control coordinates point (px) are formed by morphing a shape of the model control patterns PA, PB, PC having J pieces and corresponding to each morphing coordinates (pa, pb, pc), in the control pattern space CPS extended by the second type of input variable $\beta$ and the output variable $\alpha$. The morphing is performed according to weight between the morphing coordinates (pa, pb, pc) in the M-dimensional input space MPS and the actual control coordinates point (px). Combined control patterns Px are formed, and output variable value $\alpha$ corresponding to the input value (px) based on the combined control pattern Px is calculated.

21 Claims, 14 Drawing Sheets

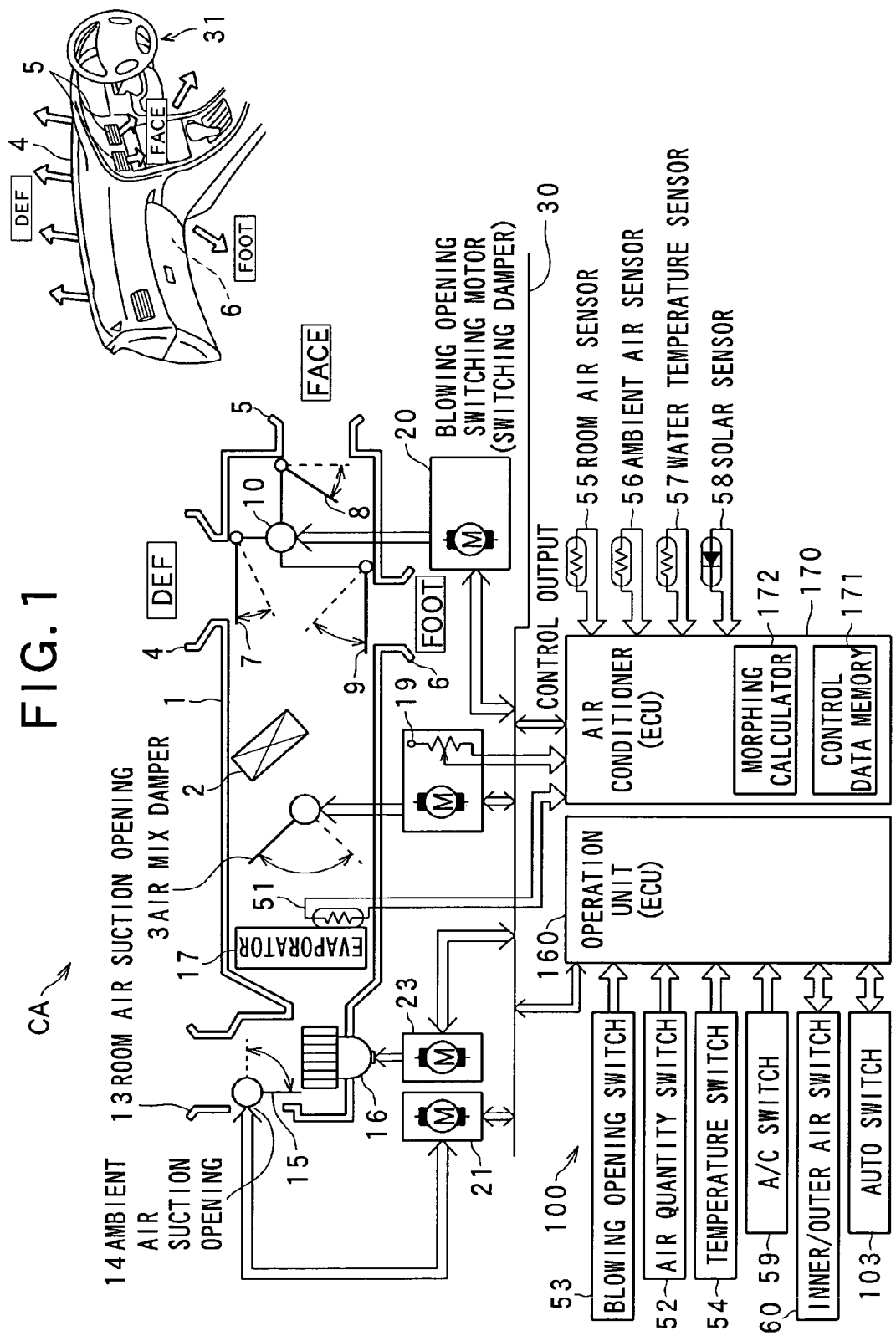

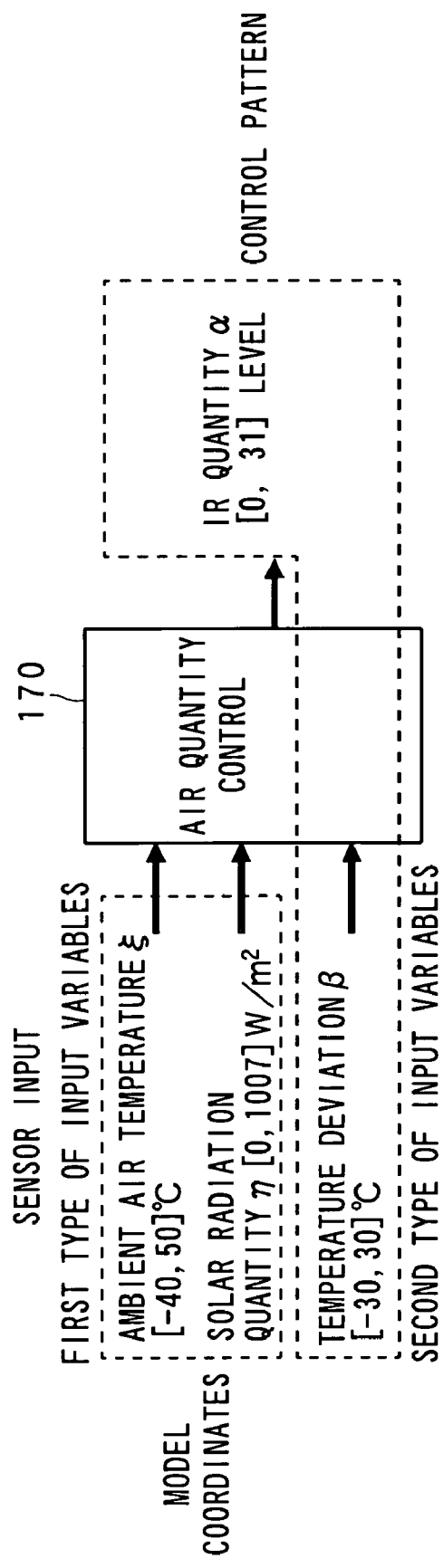

FIG. 3A

| $p_1$,P1 | $p_4$,P4 | $p_7$,P7 | $p_{10}$,P10 | $p_{13}$,P13 | $p_{16}$,P16 | $p_{19}$,P19 | $p_{22}$,P22 | $p_{25}$,P25 | $p_{28}$,P28 |
|---|---|---|---|---|---|---|---|---|---|
| $p_2$,P2 | $p_5$,P5 | $p_8$,P8 | $p_{11}$,P11 | $p_{14}$,P14 | $p_{17}$,P17 | $p_{20}$,P20 | $p_{23}$,P23 | $p_{26}$,P26 | $p_{29}$,P29 |
| $p_3$,P3 | $p_6$,P6 | $p_9$,P9 | $p_{12}$,P12 | $p_{15}$,P15 | $p_{18}$,P18 | $p_{21}$,P21 | $p_{24}$,P24 | $p_{27}$,P27 | $p_{30}$,P30 |

170

$$p_i = (\xi_i, \eta_i)$$

FIG. 3B

| $p_1$,R1 | $p_4$,R4 | $p_7$,R7 | $p_{10}$,R10 | $p_{13}$,R13 | $p_{16}$,R16 | $p_{19}$,R19 | $p_{22}$,R22 | $p_{25}$,R25 | $p_{28}$,R28 |
|---|---|---|---|---|---|---|---|---|---|
| $p_2$,R2 | $p_5$,R5 | $p_8$,R8 | $p_{11}$,R11 | $p_{14}$,R14 | $p_{17}$,R17 | $p_{20}$,R20 | $p_{23}$,R23 | $p_{26}$,R26 | $p_{29}$,R29 |
| $p_3$,R3 | $p_6$,R6 | $p_9$,R9 | $p_{12}$,R12 | $p_{15}$,R15 | $p_{18}$,R18 | $p_{21}$,R21 | $p_{24}$,R24 | $p_{27}$,R27 | $p_{30}$,R30 |

170

$$p_i = (\xi_i, \eta_i)$$

METHOD AND DEVICE FOR CONTROLLING EQUIPMENT BASED ON MULTIPLE-INPUT/ONE-OUTPUT CONTROL

CROSS REFERENCE TO RELATED DOCUMENT

The present application claims the benefit of Japanese Patent Application No. 2007-201078 filed on Aug. 1, 2007 and No. 2008-80925 filed on Mar. 26, 2008, the disclosure of which is incorporated herein by reference.

BACKGROUND OF THE INVENTION

1. Technical Field

The present invention relates to a method and a device for controlling an equipment, and in particular, to a method and a device for controlling an equipment based on multiple-input/one-output control.

2. Background Art

Recent automatic air conditioners for automobiles are arranged to control their blowing air quantity and blowing air temperature to the adequate values corresponding to automobiles' environments, referring to various sensor inputs such as inputs from an ambient temperature sensor, a solar radiation quantity sensor and a room temperature sensor. This control system requires a control specification to connect the set values of the blowing air quantity value and blowing air temperature value (which are defined by the opening degree of an air mix damper) to the sensor input values. Conventionally widely used air conditioner control systems include a TAO method (described below). An automotive air conditioner controls the blowing air temperature and air quantity based on the temperature information of a room temperature sensor so that the room temperature comes closer to the aimed set temperature.

In this air conditioner, target blowing air temperature (TAO) is calculated by the following formula.

$$TAO = E \times (T_{SET} + \Delta T) - F \times T_R - G \times T_{AM} - H \times TS + C$$

($T_{SET}$: set temperature; $T_R$: room temperature; $T_{AM}$: ambient temperature; TS: solar radiation quantity; $\Delta T$ and C: correction constants; E to H: coefficients)

A neural network is also known as another system which is appropriate for the multiple-input/one-output control.

The TAO method has to define control coefficient of $\Delta T$, C, E to H and others as different values depending on types of automobiles.

However, the TAO is a multivariable function having four input variables, as the degrees of freedom, such as the set temperature (TSET), room temperature (TR), ambient temperature (TAM), and solar temperature (TS). Finding suitable values for multi variables while making the variables change independently requires considerable manpower, even though simulations can be used, and considerable time has to be spent in developing the control logic using the TAO.

The controller that uses the neural network tends to increase, at an exponential rate, the number of processing elements to be needed, as the number of inputs increases. Further, this system requires complicated learning processes to be repeated many times until desired input results for various input combinations are obtained, which requires a long lead time for the development. Further, an application of the learning processes requires a computer with high performance, which causes installation cost to be high.

SUMMARY OF THE INVENTION

Therefore, it is an object of the present invention to provide an equipment control method and an equipment control device, which are applied to the multiple-input/one-output type of equipment control system, can obtain desired output results from input values by merely preparing and applying easily obtainable model control patterns to simple and less processing-intensive algorithms.

An equipment control method according to the present invention is allowed to control equipment by referring at least N pieces (N≧2) of mandatory input variables, and by calculating a primarily defined single output variable value based on the mandatory input variables. The mandatory input variables include fixed first type of input variables and remaining second type of input variables. The first type of input variables have M (1≦M<N) pieces, and the second type of input variables have (N−M) pieces. Each of the first type of input variables and the second type of input variables has different types of input variables.

The equipment control method comprises following steps of:

(1) separately preparing a plurality of model control patterns for defining a relation between the second type of input variables having (N−M) pieces and the output variable values, for determining the output variable values according to the mandatory input variable values, wherein the patterns are defined on each of model coordinates in predetermined Q pieces (Q≧2) on an M-dimensional input space extended by the first type of input variables;

(2) appointing coordinates in the M-dimensional input space of the first type of input variables included in N-dimensional input values as actual control coordinates, when the N-dimensional input values of the mandatory input variables are provided; as well as defining J pieces (2≦J≦Q) in model coordinates as morphing coordinates, the J pieces being present in a predetermined morphing-objective space which includes actual control coordinates point in the M-dimensional input space;

(3) forming combined control patterns corresponding to the actual control coordinates point by morphing a shape of the model control patterns having J pieces and corresponding to each morphing coordinates, the morphing is performed according to weighting between the morphing coordinates in the M-dimensional input space and the actual control coordinates; and (4) calculating output variable values corresponding to the N-dimensional input values based on the combined control patterns.

An equipment control device according to the present invention is allowed to control equipment by referring at least N pieces (N≧2) of mandatory input variables, and by calculating a primarily defined single output variable value based on the mandatory input variables. In this device, the mandatory input variables include fixed first type of input variables and remaining second type of input variables. The first type of input variables have M (1≦M<N) pieces, and the second type of input variables have (N−M) pieces. Each of the first type of input variables and the second type of input variables has different types of input variables.

The equipment control device basically comprises the following four means:

(1) A control feature information memory means used for separately preparing a plurality of model control patterns for defining a relation between the second type of input variables having (N−M) pieces and the output variable values, for determining the output variable values according to the mandatory input variable values. The patterns are defined on each of model coordinates in predetermined Q pieces (Q≧2) on an M-dimensional input space extended by the first type of input variables;

(2) a morphing coordinates means utilized for appointing coordinates in the M-dimensional input space of the first type of input variables included in N-dimensional input values as actual control coordinates, when the N-dimensional input values of the mandatory input variables are provided;

(3) a control pattern morphing means used for forming combined control patterns corresponding to the actual control coordinates point by morphing a shape of the model control patterns having J pieces and corresponding to each morphing coordinates. The morphing is performed according to weighting between the morphing coordinates in the M-dimensional input space and the actual control coordinates, in the control pattern space extended by the second type of input variables and the output variables; and (4) an output variable calculation means used for calculating output variable values corresponding to the N-dimensional input values based on the combined control patterns.

In the present invention, when the number of variables in the mandatory input variables used for equipment control is two or more, the variables are divided into the second type of input variables, which is directly written as the model control patterns with relation to the output variables, and the first type of input variables, which is used for mapping the model control patterns. The space extended by the first type of input variables is designated as an M-dimensional space. The number M of the first type of input variables can be one or two, and the one variable forms a one dimension space (straight line), whereas the two variables form a two-dimensional space (plane). Thus, the M-dimensional input space becomes a space of three or more dimensions in a narrow definition=when M is three or more. The space extended by the second type of input variables and the output variables form the control patterns. The number N of the second type of input variables can be one, which forms a two-dimensional space (plane) with a combination of the output variables. Thus, the control pattern space becomes a space of three or more dimensions in a narrow definition, when N is two or more.

For a variety of combinations of the first type of input variable values, two or more of model coordinates are defined on the M-dimensional input space, and the model control pattern is mapped and prepared for each of the model coordinates, reflecting desired control feature between the second type of input variables and the output variables for each of the combinations of individual first type of input variable values. When the present values of the mandatory input variables are given, the coordinate points can be plotted as the actual control coordinates on the M-dimensional input space, by extracting the first type of input variable values in the mandatory input variables. Two or more of the model coordinates, which are present on the predetermined morphing-objective space that includes the actual control coordinate point, are defined as the morphing coordinates.

The actual control coordinates point representing the present values of the first type of input variables change every second, and it never meets any of the model coordinates, in general. Therefore, a plurality of the model coordinates abutting the actual control coordinate point is selected as the morphing coordinates. The specific selection of them depends on how the morphing-objective space is set. Each of the model coordinates is given its own model control patterns. Each model control pattern is the control function to write how to change the output variables depending on the remaining second type of input variable values, when the first type of input variables out of the mandatory input variable are fixed on the coordinates values of the model coordinates. Viewing this on the control pattern space can allow ones to grasp this as a figure having own shape on each model coordinates.

The inventors of the present invention acquired the control pattern (control function) by ideally changing it to a figure, and adopted the morphing technique (see, for example, "IEEE Computer Graphics and Applications, January/February 1998, 60-73."), which had specialized in the image process field into the equipment control field, thereby the inventor has found that the control pattern originally not prepared for the actual control coordinates can be readily obtained. This has allowed the inventor to invent this invention. That is, the model control patterns prepared in accordance with a plurality of the morphing coordinates in the M-dimensional input space are considered to be a figure in each control pattern, and weighting factors given by a distance between each morphing coordinates point and the actual control coordinates point in the M-dimensional input space can allow the morphing to be done in the same manner as the image composition process. Conventional morphing is aimed only at visually outputting images combined by the morphing. In the present invention, the control patterns are combined by the morphing, and the combined control patterns resulted in the morphing are secondly used for equipment control process as control function for determining the output variable values when the second type of input variables are given.

The combined control patterns corresponding to the actual control coordinates point given by the morphing are obtained by the pure image combine process. However, the combined control patterns do not conflict at all with the control technique. Also, they can reflect desired control feature at the actual control coordinate point, as far as each control pattern is prepared as a reflection of proper control feature between the second type of input variables and the output variables. Although, the equipment control has a multiple-input and single-output embodiment, the main work in development is to only mechanically repeat, for example, experimental tests on gaining the model control patterns that represent the relation between the second type of input variables and the output variables, for each value (coordinates value of the model coordinates) of the first type of input variable values. The installation of the obtained model control patterns to equipment leads to an actual and immediate use of the equipment. Further, the image combined algorithm obtained easily with less man-hour by the morphing can result in the desired equipment control method and device, with which desired output results can be derived from any input values.

The first type of input variables with a number M of two pieces causes the M-dimensional input space to form two or more dimension of space. A group of the model coordinated points and the model control pattern has to be prepared on the same dimension space in a mapping form. In this case, easy and proper determination of the morphing coordinates against the actual control coordinate point in the M dimension can be determined in such a manner as follows, which can make the morphing algorithm simpler. That is, the frame connection of the adjacent model coordinates in the M-dimensional input space allow a plurality of unit cells to be disposed so as to tightly section the M-dimensional input space in a manner that each vertex is a model coordinates point. Among the unit cells, the one including the actual control coordinate point is designated as the morphing-objective space, and the model coordinates representing the vertexes of the unit cell are used as the morphing coordinates. Sectioning in advance the M-dimensional input space into unit cells (the morphing-objective space) as well as determining which unit cell the actual control coordinates point belong to can allow the model coordinates, each of which is a vertex of the unit cell, to be easily determined as the morphing coordinates.

The minimum number of the vertexes of such a unit cell is M+1 that is obtained by connecting the model coordinates dispersed in the M-dimensional input space with one another. For example, M-dimensional input space forms a unit cell (i.e., a simplex) having the shape of a triangle that is given minimum vertexes. Wherever the actual control coordinates point is disposed in the M-dimensional input space, the model coordinates representing the vertexes of the simplex, in which the actual control coordinates point is included, can be primarily determined so that each of the model coordinates point is determined as the nearest (M+1) coordinates point. Such frame connecting method can include such a method that when simplex circumscribed M dimension sphere (when M=2, it forms a circle) extended by the model coordinates of (M+1) pieces is drawn, the circumscribed M dimension sphere excludes other model coordinates. In this method, each simplex (in the broad sense) sectioning the space is referred to as a Delaunay triangle (when M is three, the Delaunay triangle forms a triangular pyramid having four vertexes). The use of the Delaunay triangle as the unit cell allows the combined control patterns to be obtained, with the use of model coordinates nearest to the actual control coordinates point, as well as the use of the morphing of the smallest number of the model control patterns. This can simplify the process.

The unit cell can be selected as a redundant vertex unit cell having M+2 pieces of vertexes. In this case, the equipment control method for controlling equipment according to the present invention can be performed by referring to at least N pieces (N≧3) of mandatory input variables, and by calculating a primarily defined single output variable value based on the mandatory input variables. The mandatory input variables include fixed first type of input variables and remaining second type of input variables. The first type of input variables has M (2≦M<N) pieces, and the second type of input variables has (N−M) pieces. Each of the first type of input variables and the second type of input variables has different types of input variables. This method comprises the following steps of:

(1) Separately preparing a plurality of model control patterns for defining a relation between the second type of input variables having (N−M) pieces and the output variable values, for determining the output variable values according to the mandatory input variable values, wherein the patterns are defined on each of model coordinates in predetermined Q pieces (Q≧2) on an M-dimensional input space extended by the first type of input variables;

(2) appointing coordinates in the M-dimensional input space of the first type of input variables included in N-dimensional input value as actual control coordinates, when the N-dimensional input values of the mandatory input variables are provided, as well as defining J pieces (2≦J≦Q) in model coordinates as morphing coordinates, the J pieces are present in a predetermined morphing-objective space which includes actual control coordinates point in the M-dimensional input space;

(3) forming combined control patterns corresponding to the actual control coordinates point by morphing a shape of the model control patterns having J pieces and corresponding to each morphing coordinates, the morphing is performed according to weight between the morphing coordinates in the M-dimensional input space and the actual control coordinates, in the control pattern space extended by the second type of input variables and the output variables; and (4) calculating output variable values corresponding to the N-dimensional input values based on the combined control patterns.

In this method, adjacent model coordinates are frame connected with one another in the M-dimensional input space, thereby a plurality of redundant vertex unit cells are disposed so as to tightly section the M-dimensional input space by appointing vertexes as the model coordinates, the unit cell having M+2 pieces of vertexes.

Among the redundant vertex unit cells, ones including the actual control coordinated points are designated as the morphing-objective space, M+2 pieces of the model coordinates forming the vertexes of the redundant vertex unit cells are used as the morphing coordinates.

The application of the redundant vertex unit cell having more vertexes (M+2 or more pieces) than simplex allows the model control patterns relating to formation of the combined control patterns to be increased in number (to be redundant), and improves the properness of the control contents at the actual control coordinates point following the combined control patterns.

A particular application of the redundant vertex unit cell can simplify the morphing calculation of the model control patterns. For example, the redundant vertex unit cell can be selected as a hypercube having $2^M$ vertexes. The hypercube becomes a rectangular solid when the number of dimensions M is three (conceptually including a cube), and becomes a rectangle (conceptually including a square) when the number of dimensions M is two. The M-dimensional input space in this case takes a rectangular coordinate system.

When the vertexes of the redundant vertex unit cell, that is all of the model coordinates, are set at random, the morphing calculation should be concerned as such that the coordinates values of Mx (the number of all vertexes) are the independent variables. An application of the above mentioned hypercube allows coordinates of other model coordinates to automatically determined from coordinates of a single model coordinates point forming a vertex of the hypercube, if the length (M ways) of each side of the hypercube is given. Accordingly, the number of independent variables to be concerned in the calculation is M (the number of coordinate components)+M (length of each side of the hypercube)=2M, and the calculation can be significantly simplified compared with a case where all of the model coordinates are set at random. Particularly, setting a plurality of hypercubes, which forms the redundant vertex unit cell, to be combined with one another can allow each side of the hypercube to be constant. Therefore, in the calculation process, only the coordinate components of a single coordinate point should be designated as the variable, which requires only M pieces of independent variables to be concerned in the calculation, resulting in a further simplified calculation.

The application of the following method can significantly simplify the morphing algorithm, when the combined control patterns are to be obtained by a combination of linear interpolation of the model control patterns corresponding to each model coordinates point, based on the geometric relation between the model coordinates, each of which forms the corresponding vertex of the hypercube, and the actual control coordinates point. That is, cuttings are done on the plane of M pieces parallel to each face via the actual control coordinates point of the hypercube. By this, each hypercube shares the actual control coordinates point, and is sectioned into partial rectangular solids each having $2^M$ pieces exclusively, taking one of the model coordinates each forming a vertex of the hypercube. In the case where the M-dimensional input space takes a rectangular coordinate system, the hypercube becomes a rectangular solid when the number of dimensions M is three (conceptually including a cube), and the division number of the hypercube is eight. The hypercube becomes a rectangle (conceptually including a square) when the number of dimensions M is two, and the division number thereof is four. When generalized to the M-dimensions, the division number of partial rectangular solid against the hypercube is two.

The relative volume against the hypercube of the partial rectangular solid is designated as weight to the model coordinates positioned on an opposed side against the diagonal direction of the hypercube of the model coordinates included in the partial rectangular solid, to perform morphing. This method can allow the weight calculation of the morphing weight to be shifted to the volume calculation of each partial rectangular solid, and allows the final combined control patterns to be readily obtained, only with a few times of repetition of the model control patterns, using, for example, a combination of liner interpolation of the model control patterns.

The second type of input variables (N-M pieces) is one in number causes the model control pattern and the combined control pattern (as the control pattern extended by the second type of input variable having one piece and the output variable) to form two dimension diagram patterns. This method allows the data obtaining process of the model control patterns to fix the first type of input variables, and to simply changing of the values of the second type of input variable having one piece, to simplify the method in finding appropriate output variable values. This can lead to less processing time and a simplification of the algorithm in the morphing calculation due to the use of the diagram patterns.

The method allows the two dimension diagram patterns to be formed by a certain number of handling points disposed from the pattern starting point to the terminal point, and allows each handling point of the two dimension diagram patterns corresponding to all of the model coordinates to primarily correspond with one another, following the disposition order. The morphing process is done by applying the corresponding handling points in the two dimension diagram pattern related to the morphing coordinates, and by determining the two dimensional diagram pattern forming the combined control pattern by using the combined handling points. Restoring the two dimension diagram patterns to the combination of the handling points can lead to handling points with a limited number of morphing calculation, resulting in a decreased load in the morphing calculation. The method also allows the combined control patterns to be readily obtained by the handling points given as the result of the morphing.

The type of the two dimension diagram patterns defined by the handling points can be presented, for example, by curved line patterns including Bezier curves and B-spline curves, but it is better to use the broken curve line that is obtained by sequentially connecting the handling points, for obtaining a simpler calculation. Two dimension diagram pattern representing the control pattern can allow the inclination change of the output variables to be controlled in a discontinuous manner at folding points. Such case allows the handling points representing the folding points to be kept as the folding points corresponding the combined control pattern, even after the completion of the morphing combination process. Accordingly, this can prevent the positions of the folding points from becoming unclear, when a plurality of the two dimension diagram patterns having different folding points are geometrically blended.

An air conditioner applied as the equipment allows the mandatory input variables to include two or more out of the ambient air temperature, solar radiation quantity and temperature deviation that is given by the difference between the room temperature and the set temperature. Further, the output variables can select either the quantity or temperature (or the opening degree of a corresponding air mix damper) of the blown air. This allows the control device for an air conditioner (particularly for automobiles) to determine the model control patterns for controlling the quantity or temperature of the blow air repeatedly, and allows the result of the determination to be installed in the control body (air conditioner ECU) of the device with the morphing calculation software. Accordingly, this invention requires neither complicated plan logic nor learning process, compared with the conventional TAO system and the neural network system.

More specifically, the invention permits the mandatory input variables to include three objects, which are the ambient temperature, solar radiation quantity and temperature deviation (the difference between the room temperature and the set temperature), and permits the first type of input variables to include two factors, the ambient temperature and solar radiation quantity. Further, the invention allows the second type of input variables to include the temperature deviation only, and allows the output variables to include the air quantity. This allows the M-dimensional input space to form the two dimension coordinates plane extended by the ambient air temperature and solar radiation quantity. Also, it allows the model control patterns to be prepared as the two dimension diagram patterns showing the relation between the temperature deviation and air quantity, in a manner that the model control patterns correspond to the plurality of model coordinates on the two-dimensional coordinates plane. Accordingly, the invention allows the combined control pattern to be readily obtained in a form of the two dimension diagram patterns, which are obtained by applying the morphing process to the model control patterns.

BRIEF DESCRIPTION OF THE DRAWINGS

The present invention will be understood more fully from the detailed description herein below from the accompanying drawings of the preferred embodiments of the invention, which, however, should not be taken to limit the invention to the specific embodiments but are for the purpose of explanation and understanding only.

In the accompanying drawings:

FIG. 1 is a block diagram showing an example of an electric structure of an air conditioner control device to be applied in the present invention;

FIG. 2 is a block diagram showing a primary portion of the control system in the structure of FIG. 1;

FIG. 3A is a conceptual diagram showing content of a control data memory;

FIG. 3B is a conceptual diagram showing content of another control data memory;

DESCRIPTION OF THE PREFERRED EMBODIMENTS

Figure 4A:
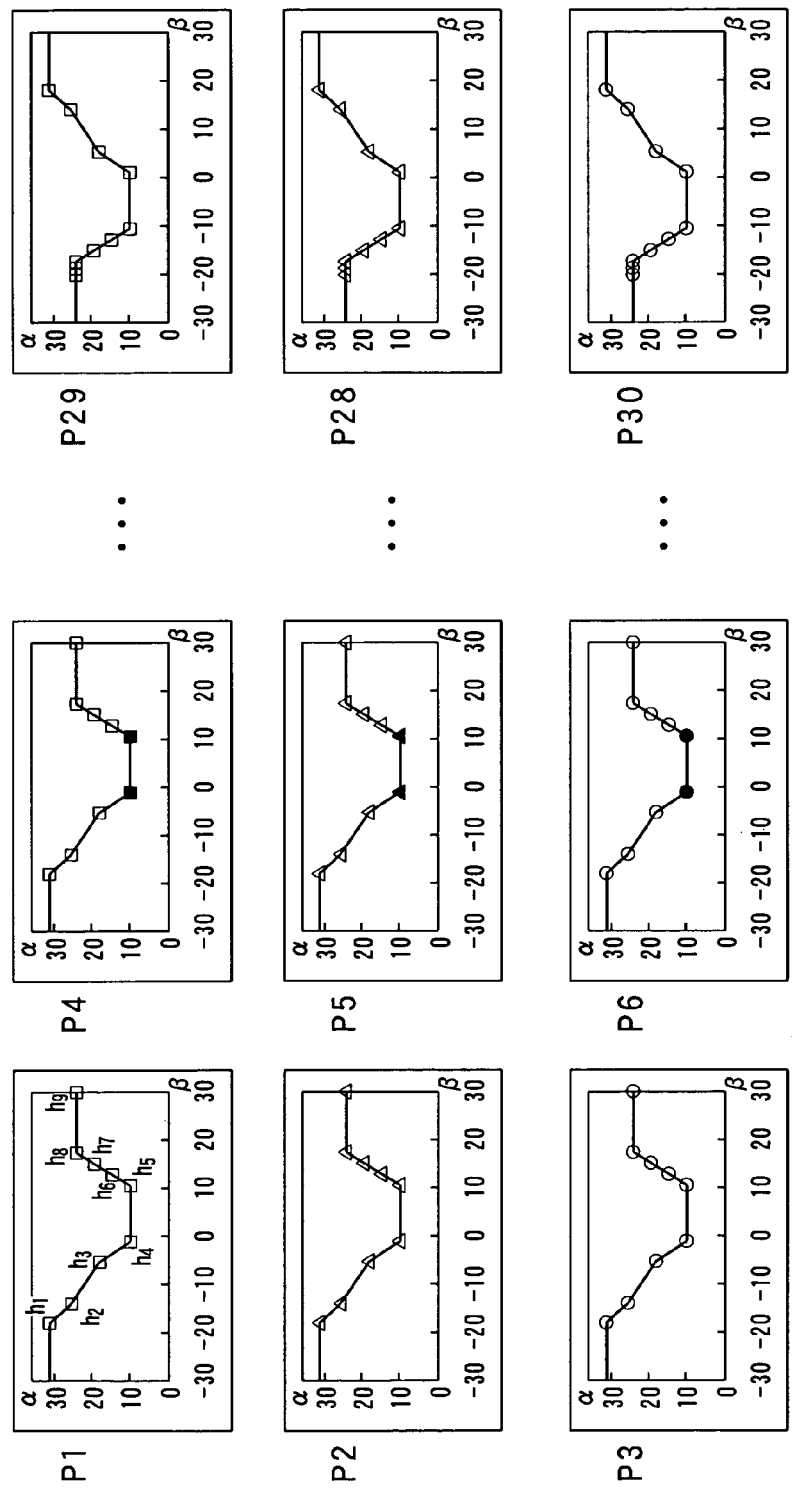
FIG. 4A shows graphs each exemplifying data patterns.
Figure 4B:
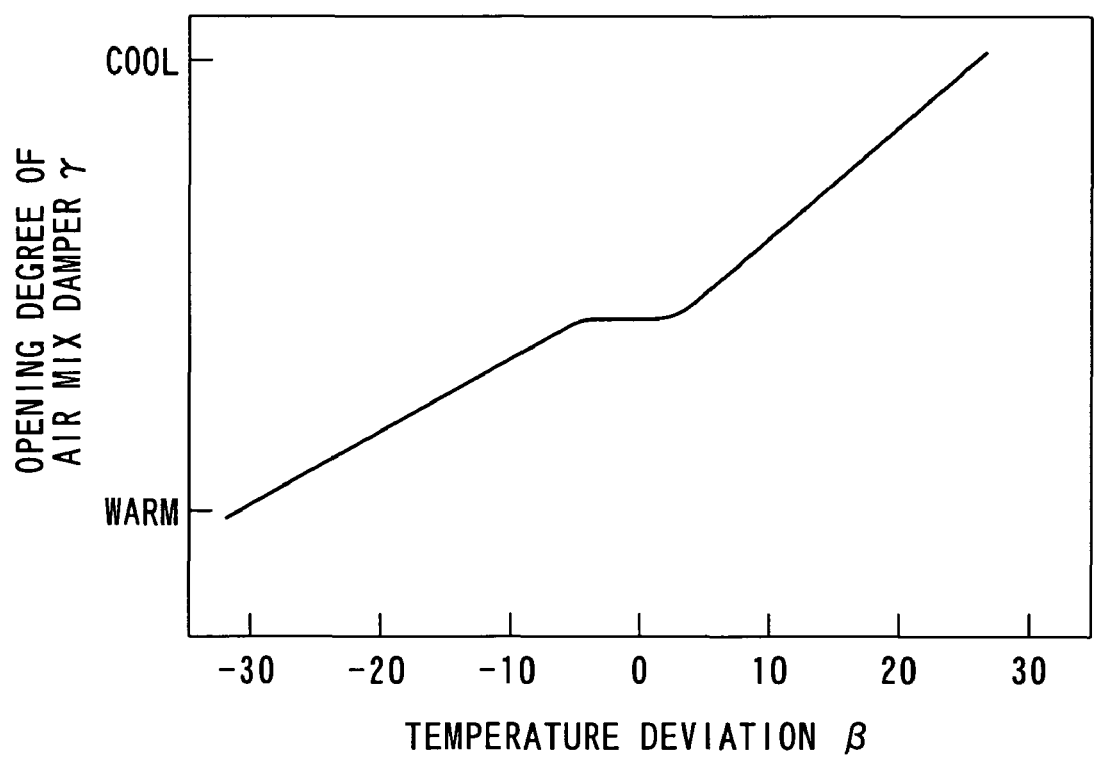
FIG. 4B is a graph showing another data pattern.

A preferred embodiment of the invention will now be described referring to the drawings.

FIG. 1 is a patterned block diagram showing the entire structure of an air conditioner control device CA, which exemplifies the equipment control device according to the present embodiment. As shown, the air conditioner control device CA comprises a duct 1. This duct 1 includes a room air suction opening 13 for circulating the room air, and an ambient (atmospheric) air suction opening 14 for taking in the ambient air. A switch damper 15 allows either of the openings 13 to 14 to operate. The blower 16 operated by a blower motor 23 causes the air from both of the openings 13, 14 to be sucked into the duct 1.

The duct 1 includes an evaporator 17 for generating cool air from the sucked air, and a heater core 2 for generating warm air from the sucked air. The heater core 2 heats the sucked air using the waste heat from engine cooling water. The cool air and the warm air are mixed together at a proportional rate set by the inclination of an air mix damper 3, and the mixture of the air is blown out through blow openings 4, 5 and 6. The defrost blowing openings 4 for preventing a front glass from being clouded are disposed at an upper end of the instrument panel that faces an inner lower edge of the front glass. The face blowing openings 5 are disposed at a center front of the instrument panel. The foot blowing openings 6 are disposed at a lower end of the instrument panel, which faces passengers' feet in the vehicle. These openings 4, 5 and 6 are individually opened and closed by the switch dampers 7, 8 and 9, respectively. More specifically, in response to the damper-control rotary input phase from the motor 20, damper drive gear mechanism 10 are driven to open only the defrost blowing opening 4, only the face blowing opening 5, only the foot blowing opening 6, both the face blowing opening 5 and the defrost blowing opening 4, both the foot blowing opening 6 and the defrost blowing opening 4, and all the face blowing opening 5, defrost blowing opening 4 and foot blowing opening 6.

The switch damper 15, the air mix damper 3 and the switch dampers 7, 8 and 9 are operated by motors 21, 19 and 20, respectively. These motors 19, 20, 21 are, for example, stepping motors, where each operation is centrally controlled by the air conditioner ECU 50, which serves as the main unit of the air conditioner driving control means. A blower motor 23 is for example a brush-less motor, and the air conditioner ECU 50 uses a PWM control manner to control blowing air quantity by controlling the rotation speed of the motor 23. The air conditioner ECU 50, which is computer hardware, is communicably connected with an evaporator sensor 51, a room air sensor 55, an ambient air sensor 56, a water temperature sensor 57, and a solar sensor 58.

An operation unit 100 for a vehicle air conditioner comprises an independent operation unit ECU 160, and this ECU is communicably connected with an air quantity switch 52, a blowing opening switch 53, a temperature switch 54, an A/C switch 59, an auto switch 103, an inner/outer air switch 60, a first display device 41 and a second display device 42. The operation unit ECU 160 is communicably connected by the air conditioner ECU 50 and a communication bus (for example, a LIN communication bus and the like including a serial communication bus).

The operation unit ECU 160, which is also computer hardware, and is communicably connected with the air quantity switch 52, air blowing opening switch 53, temperature switches 54D and 54P, A/C switch 59, auto switch 103, inner/outer air switch 60, first display device 41 and second display device 42. Each operation input status of the air quantity switch 52, blowing opening switch 53, temperature switches 54D and 54P, A/C switch 59, auto switch 103 and inner/outer air switch 60 is transmitted to the air conditioner ECU 50 through the operation unit ECU 160 and the communication bus 30.

In particular, the air conditioner ECU 50 basically performs the following control operations by executing the air conditioner control firmware implemented in a built-in ROM or other memory means, in association with the operations of the operation unit ECU 160.

The units 50 and 160 allow a driving IC of a corresponding motor 21, by transmitting control signals, to cause the switch damper 15 to incline toward the room air side or the ambient air side, according to an operation input status of the inner/outer air switch 60.

The units 50 and 160 also allow the evaporator 17 to be ON or OFF according to an operated status of the A/C switch 59.

Further, the units 50 and 160 allow an air conditioner operation mode to be switched between a manual mode and an auto mode, according to an input status of the auto switch 103 (a mode switching means).

In the auto mode, the units 50 and 160 allow the motors 19, 23, 20, by sending operation control order, to cause the air mix damper 3 to adjust air temperature, to cause the blower motor 23 to adjust air quantity, and to cause the dampers 7, 8 and 9 to adjust their positions, in order to make the room temperature become closer to a set temperature. This operation is done by referring to input information given by the temperature switches 54D and 54P, and output information given by the room air sensor 55, ambient air sensor 56, water temperature sensor 57, and solar sensor 58.

Moreover, in the manual mode, the units 50 and 160 allow the blower motor 23, by transmitting driving control order, to perform air quantity adjustment according to operation input statuses of the air quantity switch 52 and the blowing opening switch 53. The units 50 and 160 further allow the motor 20 to cause the dampers 7, 8 and 9 to have a corresponding open/close status.

The air conditioner control device CA calculates one output variable value, referring to N pieces (N≧2) of mandatory input variables, which are primarily defined for the mandatory input variables, and it controls equipment according to the output variable values. The mandatory input variables include types of first type of input variables having M (1≦M<N) pieces and fixed, and a remaining second type of input variables having different types of input variables and having "N−M" pieces.

In particular, as shown in FIG. 2, the mandatory input variables consist of ambient temperature $\xi$, solar radiation quantity $\eta$ and temperature deviation $\beta$ (that is N=3), wherein first type of input variables consist of the ambient temperature $\xi$ and the solar radiation quantity $\eta$ (that is, M=2), and the second type of input variable consists of the temperature deviation P (that is, N−M=1). The output variables consist of blow air quantity α or blow air temperature γ. Each of the blow air quantity α and the blow air temperature γ is independently controlled. The description hereinafter will proceed using the air blow quantity α. The device calculates a single output variable value primarily defined for the mandatory input variables β, referring the mandatory input variables β, ξ, η, and it controls an air conditioner, the equipment, based on the output variable α.

The firmware is carried out by a computer to implement the functional means including control feature information memory means, morphing coordinates means, control pattern morphing means, and output variable calculation means.

Of these means, the control feature information memory means operates for separately preparing a plurality of model control patterns P (see FIG. 3A) for defining a relation between the second type of input variable (the temperature deviation β) having Equipment M (N–M) pieces (thus one in this embodiment) and the output variable value (the air quantity α), for determining the output variable (air quantity α) value according to the mandatory input variable values (the ambient temperature ξ, solar radiation quantity η, and temperature deviation β value). The control data memory 171 shown in FIG. 1 is used to carry out this operation. The patterns are defined on each of model coordinates in predetermined Q pieces (Q≧2) (as shown in FIG. 3A, Q=30 in this embodiment) on an M-dimensional input space MPS (the plane formed by ξ and η) extended by the first type of input variables (the ambient air temperature ξ and solar radiation quantity η).

Figure 5:
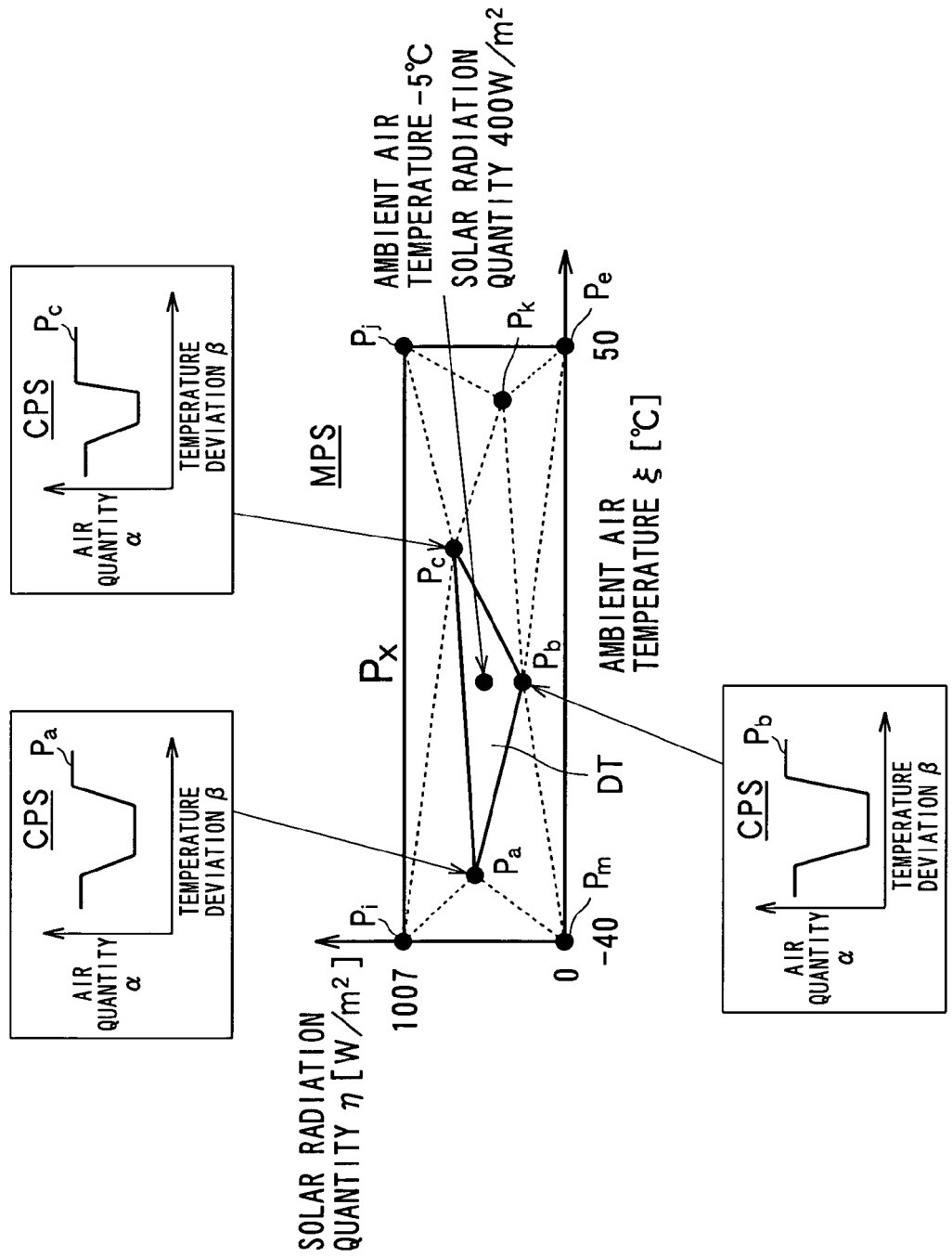
FIG. 5 is an illustration exemplifying how to divide an M-dimensional input space into unit cells.

The morphing coordinates means is as follows. As shown in FIG. 5, this operates for appointing coordinates in the M-dimensional input space MPS (the plane of ξ-η) of the first type of input variables (the ambient air temperature ξ and solar radiation quantity η) included in N-dimensional (three-dimensional) input value px as actual control coordinates px, when the N-dimensional input value (px) of the mandatory input variables (the ambient air temperature ξ, solar radiation quantity η and temperature deviation β) is provided. This also performs for defining J pieces (2≦J≦Q) (in this embodiment, J=3 and the morphing-objective space DT is Delaunay triangle) in model coordinates as morphing coordinates (pa, pb and pc), the J pieces is present in a predetermined morphing-objective space DT which includes actual control coordinates point px in an M-dimensional input space MPS (the plane of ξ-η).

The control pattern morphing means performs for forming combined control patterns Px corresponding to the actual control coordinates point px by morphing a shape of the model control patterns Pa, Pb, Pc having J pieces and corresponding to each morphing coordinates (pa, pb, pc), the morphing is performed according to the weighting between the morphing coordinates pa, pb, pc in the M-dimensional input space MPS (the plane of ξ-η) and the actual control coordinates (px), in the control pattern space CPS (the plane of β-α) extended by the second type of input variable (the temperature deviation β) and the output variable (the air quantity α).

The output variable calculation means performs for calculating output variable value (the air quantity α) corresponding to the N-dimensional input values based on the combined control patterns Px.

The air conditioner control device will be further described in detail. As shown in FIG. 2, the air conditioner ECU 170 reads values detected by three sensors as shown in FIG. 3, which are the room air sensor 55, ambient air sensor 56 and solar sensor 58, as well as set temperature set by the temperature switch 54. The detected value of the ambient sensor 56 is given as the ambient air temperature ξ, and that of the solar sensor 58 is given as the solar radiation quantity η. The difference between the set temperature and the detected value of the room sensor 55 is given as the temperature deviation P (the temperature deviation β reads minus if the room temperature is below the set temperature, and it reads plus if the former exceeds the set temperature).

Pairs of the ambient air temperature ξ and the solar radiation quantity η values represent actual control coordinates points px on the M-dimensional input space MPS (the plane of ξ-η). Various groups consisting of the ambient air temperature ξ and solar radiation quantity η (the first type of input variables) having variable values are determined as the model coordinates p. As shown in FIG. 3A, the control data memory 170 stores the model control pattern Pi (=P1 to P30) in each of the model coordinates pi (ξi, ηi).

As shown in FIG. 4A, each model control pattern Pi (=P1 to P30) represents a two dimension diagram pattern to be drawn on the control pattern plane CPS (the β-α plane) which is extended by the temperature deviation β (the second type of input variable) and air quantity α (the output variable). Each pattern includes a certain number (nine in the drawing) of handling points hi from its starting point to the terminal point, and it is defined by the broken curve line pattern given by the line connecting the handling points hi. Accordingly, the control pattern P can be primarily defined as a combination of coordinates values on the β-α plane of the handling points hi. Each handling point h at each model control pattern Pi has a primary corresponding relation with one another, according to the alignment order.

Figure 9:
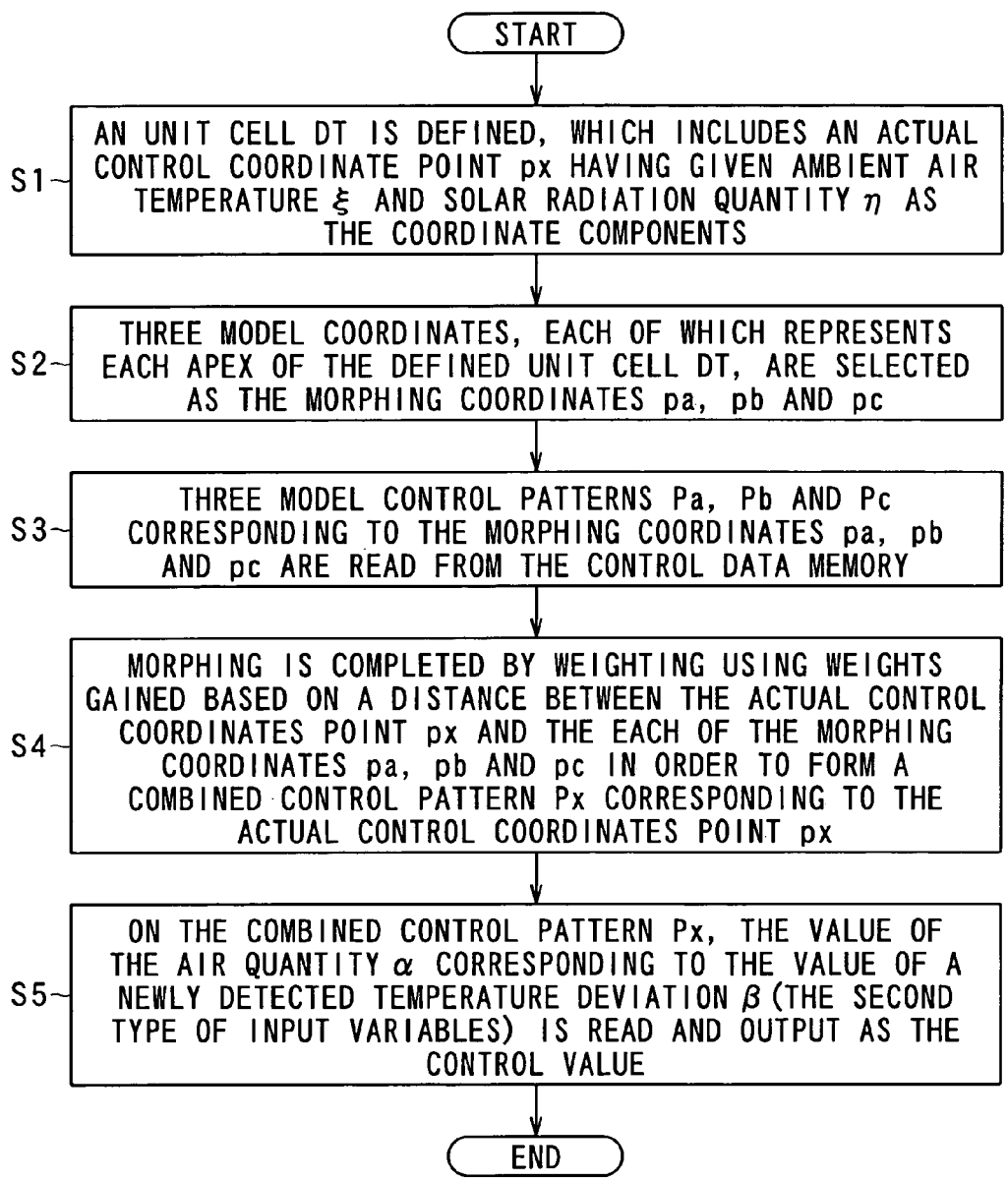
FIG. 9 is a flowchart showing processes for an air quantity control system using the polymorphing calculation algorithm shown in FIG. 8.

The M-dimensional input space MPS (the ξ-η plane) extended by the ambient air temperature ξ and solar radiation quantity η, which are the first type of input variables, is tightly sectioned by the Delaunay triangles (simplex), each vertex thereof is represented by the model coordinate point. The detailed control flow using the Delaunay triangles is shown in the flow chart in FIG. 9. First, a unit cell DT is defined, which includes the actual control coordinate point px having the given ambient air temperature ξ and solar radiation quantity η as the coordinate components (step S1). Second, three model coordinates, each of which represents each vertex of the defined unit cell DT, are selected as the morphing coordinates pa, pb, pc (step S2).

Figure 6:
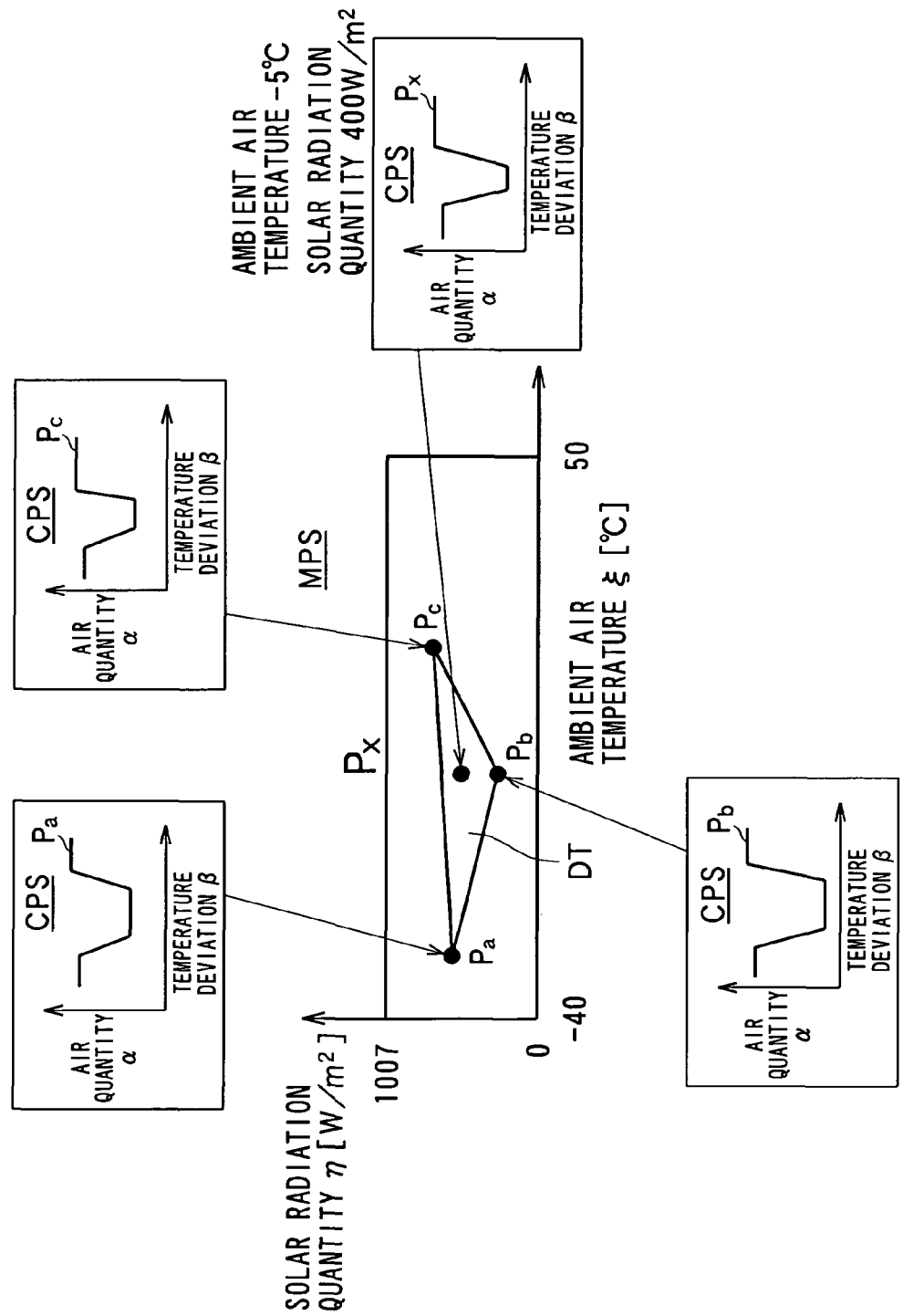
FIG. 6 is an illustration showing a relationship between actual control coordinates and morphing coordinates.

Third, as shown in FIG. 6, three model control patterns Pa, Pb, Pc corresponding to the morphing coordinates pa, pb, pc are read from the control data memory 170 (step S3). Fourth, morphing is completed by weight gained based on a distance between the actual control coordinates point px and the each of the morphing coordinates pa, pb, pc, in order to form a combined control pattern Px corresponding to the actual control coordinates point px (step S4). The morphing calculator 172 shown in FIG. 1 performs this calculation.

Figure 7:
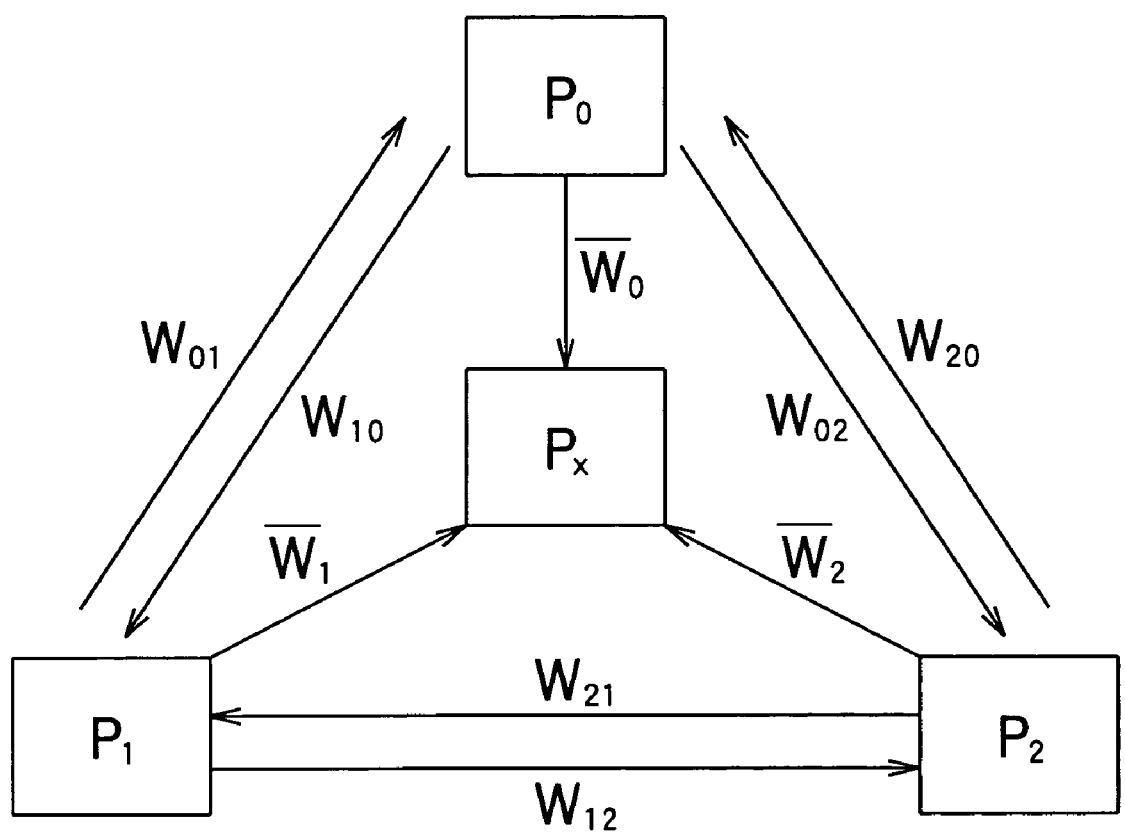
FIG. 7 is a diagram showing the concept of polymorphing.

FIG. 7 conceptually shows a polymorphing algorithm according to the method introduced in "IEEE Computer Graphics and Applications, January/February 1998, 60-73." Three control pattern diagrams Po, P1, P2 each corresponding to a vertex of the Delaunay triangle is exemplified, in which the function Wij designates the warp function from Pi to Pj, and it defines a point on Pj which corresponds to each point on Pi. A combined control pattern P can be formed by applying Wij to the gravity center coordinate gi, and inserting Wij for each Pi inside the line shape, thereby providing an intermediate warp function Wi bar. Mutually adjacent two Pi are intermediately combined the Wi bar with the use of a weight in relative to the px gravity center coordinate G* of the actual control coordinates, providing an intermediate control pattern Pi bar. The combined control pattern Px can be given by linearly combining the respective points (i.e., respective handling points) of the Pi bar with the use of a weight shown by the gravity center coordinate gi.

Figure 8:
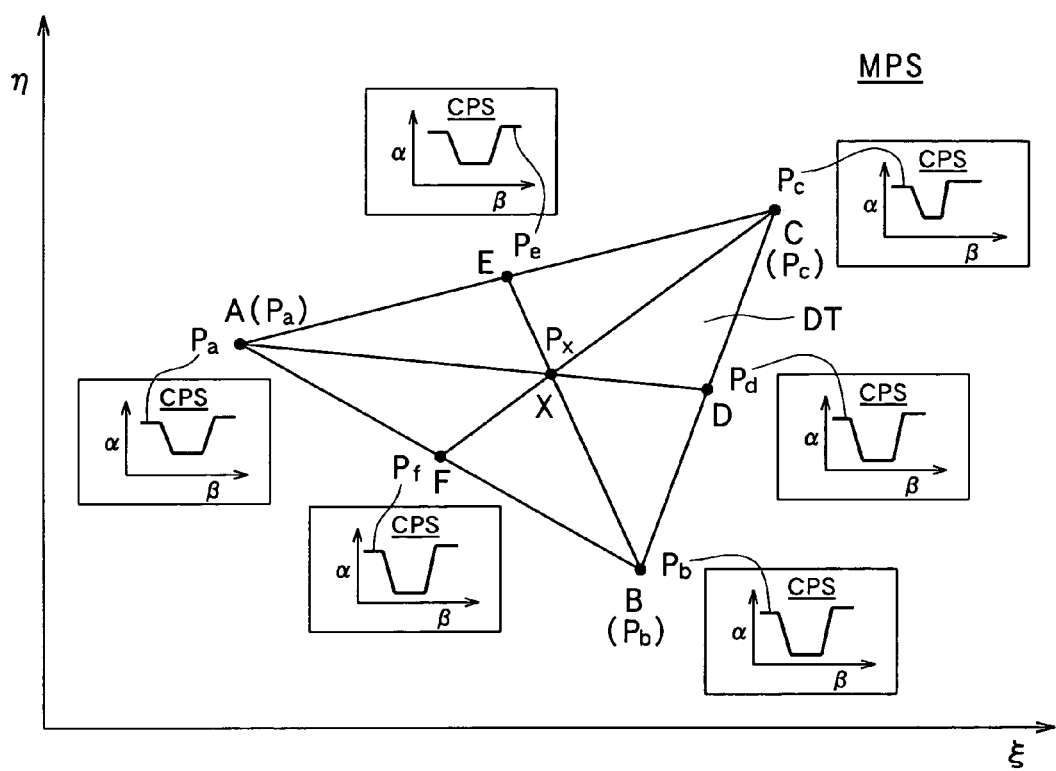
FIG. 8 is an explanatory diagram explaining the concept of polymorphing calculation algorithm for control patterns given as diagram patterns.

FIG. 8 further describes the above in detail. On the ξ-η plane, the morphing coordinates pa, pb and pc are represented by the points A, B and C. A point X represents an actual control coordinate point px. Each of the components of the gravity center coordinate G* can be represented by "ga, gb, gc" and formulated by a formula (1), when a line is drawn from each of vertexes A, B, C to the corresponding side through the point X and each intersection is designated as D, E and F.

That is, when the gravity coordinate of the combined control pattern Px is given by G*≡($g_a$, $g_b$, $g_c$), $$g_a = \frac{DX}{AD}$$
$$g_b = \frac{EX}{BE}$$
$$g_c = \frac{FX}{CF}$$
(1)

The coordinate values of each point and the length of each side can be calculated by a known analytic geometry, thus omitting a detailed description. Three intermediate control pattern Pi bars can be calculated by the formula (2), using Pd, Pe and Pf shown in FIG. 8. Thus, Px can be calculated by combining the line shapes of Pd, Pe and Pf with the use of ga, gb and gc as weights therefor.

The entity of each of model control patterns Pa, Pb, Pc corresponding to each of morphing coordinates points pa, pb, pc is, as described hereinabove, a broken line pattern given by the connected handling points, and is equal to the combination of coordinates values of handling points hi on the β-α plane. Accordingly, the combination of the handling points of the intermediate control patterns Pd, Pe, Pf can be obtained by substituting Pa, Pb, Pc by a formula (2) with the corresponding coordinate values of the handling points.

$$P_d = \frac{CD}{BC} \cdot P_c + \frac{BD}{BC} \cdot P_b$$
$$P_e = \frac{AE}{CA} \cdot P_a + \frac{CE}{CA} \cdot P_c$$
$$P_f = \frac{BF}{AB} \cdot P_b + \frac{AF}{AB} \cdot P_a$$
(2)

Further, substitution of the results in a formula (3) can give combination of the handling points of the combined control pattern Px.

$$Px = g_a \cdot Pd + g_b \cdot Pe + g_e \cdot Pf$$ (3)

The complete combined control pattern Px can be given by connecting them with one another. Finally, on the combined control pattern Px, the value of the air quantity α corresponding to the value of the newly detected temperature deviation β (the second type of input variable) is read and output as the control value (step S5).

Figure 10:
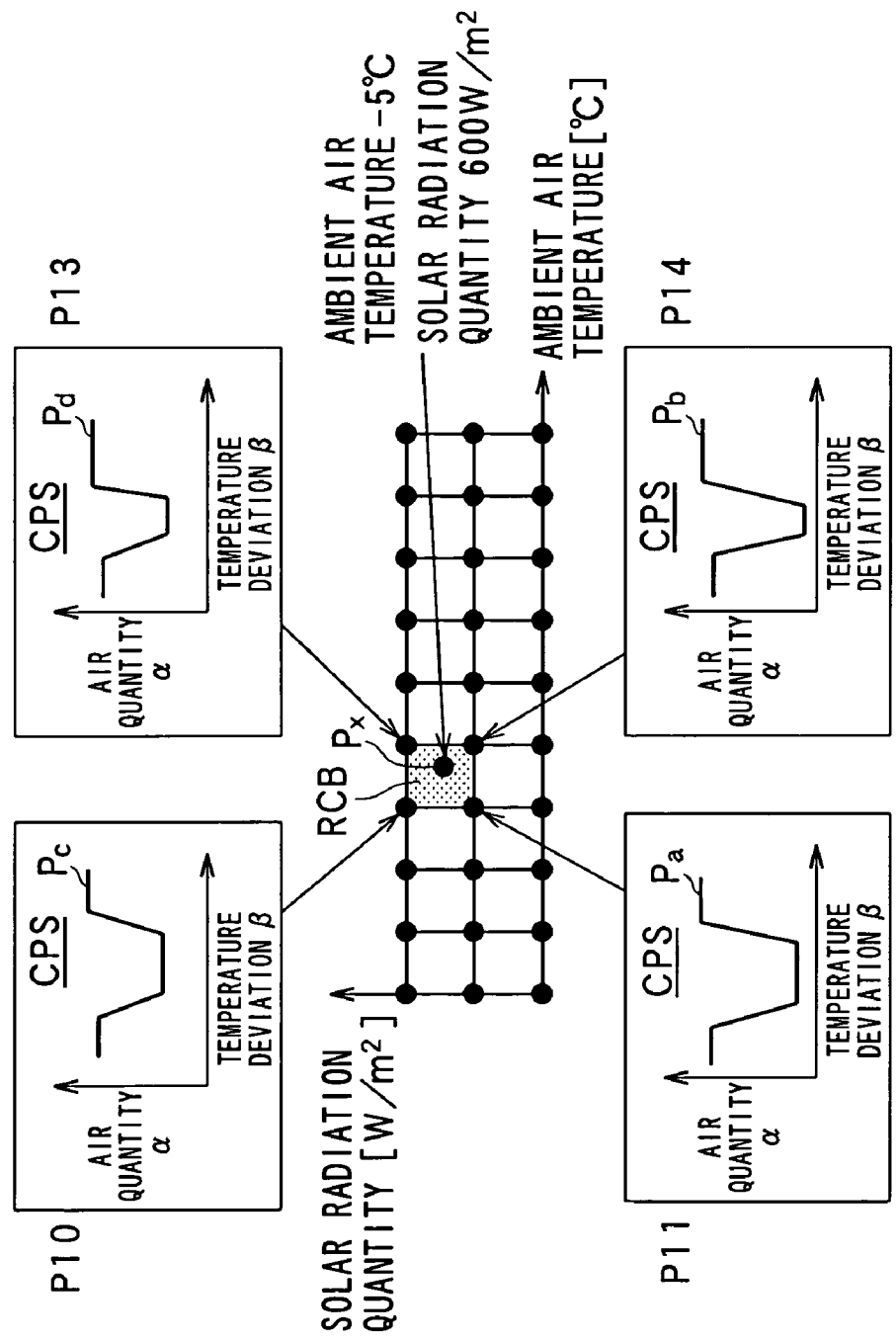
FIG. 10 is an explanation showing another example about how to divide the M-dimensional input space into unit cells.

As shown in FIG. 10, the M-dimensional input space (the ξ-η plane) can be sectioned by the redundant vertex unit cell DT having more vertexes than the Delaunay triangle (simplex). An application of the redundant vertex unit cell HCB having more vertexes (M+2 or more) than the simplex can increase the number (performing prolongation from three to four in this case) of model control patterns Pa, Pb, Pc relating to the formation of the combined control patterns Px. This can increase the properness of the control components of the actual control coordinates point px that follows the combined control pattern Px.

In this preferred embodiment, the redundant vertex unit cell HCB is selected as a hypercube HCB having $2^M$ vertexes. Each side of the hypercube HCB is set to be parallel to one of the coordinate axes having M pieces, which extends the M-dimensional input space. As shown in FIG. 10, when the M-dimensional input space takes a rectangular coordinate system, a dimension number M of two forms a rectangle (conceptually including a square), and a dimension number M of three forms a rectangular solid (conceptually including a cube).

Randomly setting the vertexes of the redundant vertex unit cell HCB, that is, all of the model coordinates, causes the morphing calculation to consider the coordinates values of Mx (the number of all vertexes) to be independent variables. However, the application of the above mentioned hypercube allows coordinates of other model coordinates to automatically determined from coordinates of a single model coordinates point forming a vertex of the hypercube, if the length (passing M) of each side of the hypercube is given.

Figure 13:
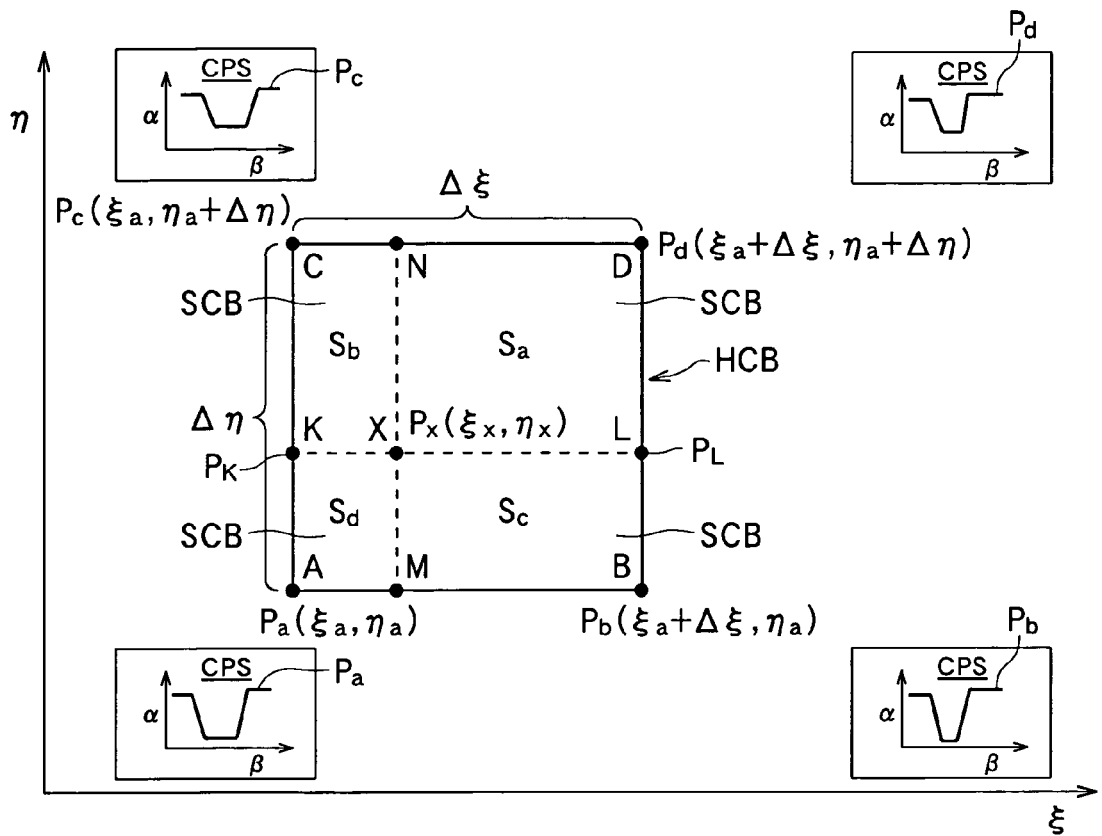
FIG. 13 is another explanation showing the concept of polymorphing calculation algorithm for control patterns given as diagram patterns.

FIG. 13 shows an actual example having the dimension number M of two. The coordinates (ξa,ηa) of the model coordinates pa forming the vertexes of a rectangle (hypercube) HCB closest to the original point of the ξ-η plane (M-dimensional input space) can allow the side length in the ξ-axis direction of the rectangle HCB to be shown as Δη, and allows the model coordinates pb, pc, pd forming the remaining three vertexes to be shown as "pb:(ξa+Δξ, ηa)", "pc:(ξa, ηa+Δη)" and "pc:(ξa+Δξ, ηa+Δη)", respectively. ξ As shown in FIG. 10, setting a plurality of the hypercube HCB, which form the redundant vertex unit cell, to be combined (that is when each of the model coordinates is disposed at equal distances in the ξ-axis and η-axis directions in a matrix form) makes Δξ and Δη constant. Accordingly, the morphing calculation allows the coordinates components ξa and ηa of a single model coordinates point to be only handled as the independent variables, which require only two independent variables in the calculation, resulting in a significantly simplified morphing calculation.

Figure 11:
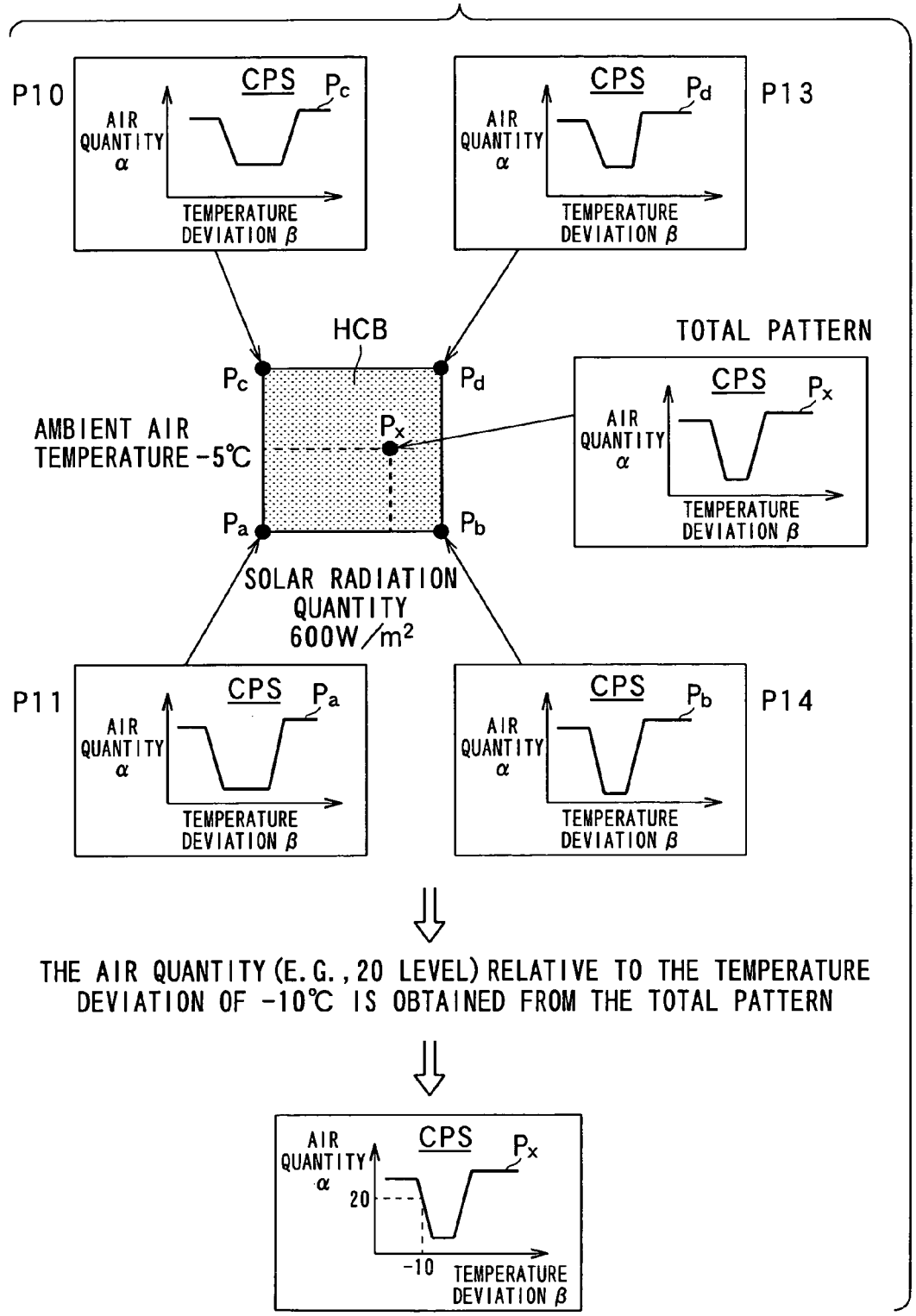
FIG. 11 is an explanation showing a relationship between the actual control coordinate points and the morphing coordinated points shown in FIG. 10.
Figure 12:
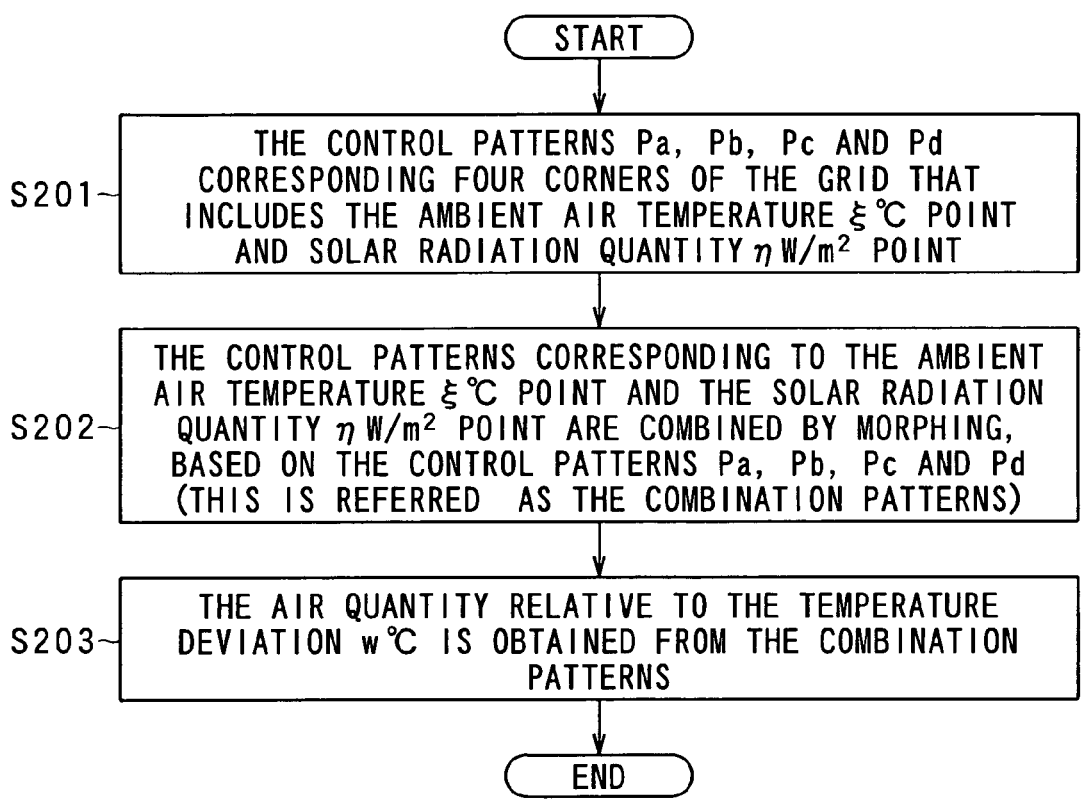
FIG. 12 is a flowchart showing processes for the air quantity control shown in FIG. 10.

FIG. 12 shows a flowchart demonstrating a specific control flow using the hypercube HCB (rectangle). First, as shown in FIG. 10, the hypercube HCB is determined, which includes the actual control coordinate point px having the coordinate components of the given ambient air temperature ξ and the solar radiation quantity η. Then, as shown in FIG. 11, four model coordinate points forming each vertex of the defined hypercube HCB are selected as the morphing coordinates pa, pb, pc, pd. Further, the corresponding four model control patterns Pa, Pb, Pc, Pd are read from the control data memory 170 (step S201). Then, a morphing process is performed with the weight that corresponds to a distance between the morphing coordinates pa, pb, pc, pd and the actual control coordinates point px so as to form a combined control pattern Px corresponding to the actual control coordinates point px (step S202). This calculation is completed by the morphing calculator 172, which is shown in FIG. 1.

FIG. 13 conceptually shows the algorithm of the control pattern polymorphing using the hypercube HCB (rectangle). The morphing coordinates pa, pb, pc, pd are designated as A, B, C, D, respectively, and the rectangular solid is cut along two straight lines (two planes) parallel to each of sides CA, DB, CD, AB, passing through the actual control coordinates point px of the rectangular solid. Accordingly the rectangle HCB shares the actual control coordinates point X (px), and the rectangle is sectioned into four pieces ($2^M$ pieces) of partial rectangles SCB, each of which exclusively takes one of the model coordinates that form the vertexes of the rectangle HCB. Specifically, the rectangle is sectioned into "CKXN (area: Sb)", "NXLD (area: Sa)", "KAMX (area: sd)" and "KMBL (area: Sd)".

The relative area (relative volume) of each partial rectangle (partial rectangular solid) SCB relative to the rectangle (hypercube) is designated as a weight to the model coordinates which are positioned on the opposed side to the diagonal direction of the hypercube of the model coordinates included in the partial rectangular solid. Using the designated weights, the morphing is performed. In this case, the coordinate pa is positioned oppositely to the coordinate pd, the coordinate pb to the coordinate pc, the coordinate pd to the coordinate pa, and the coordinate pc to the coordinate pb. That is, the combined control patterns Px is calculated and combined as the following formula, when the area of the rectangle HCB is S0.

$$Px=(1/S0)\times(Sa\cdot Pa+Sb\cdot Pb+Sc\cdot Pc+Sd\cdot Pd) \quad (13)$$

The algorithm of the morphing calculation is mathematically equivalent to a case when the combined control patterns Px are obtained by sequentially performing the following interpolation synthesis calculation. That is, the principle of leverage is used to combine primary intermediate patterns in such a manner that an orthograph point of the actual control coordinates point px of a line segment extended by the model coordinates is designated as an equinoctial point, between two adjacent model coordinates in each coordinate axis direction of the hypercube HCB. Then, the orthograph point of the actual control coordinate point px in the line segment extended by a corresponding orthograph point is designated as an equinoctial point, for the primary intermediate control pattern obtained in two sides facing each surface of the hypercube HCB. Using the principle of leverage, a secondary intermediate pattern is formed by combining the primary intermediate control patterns at the equinoctial point. This sequential process is continued repeatedly until the equinoctial point reaches the actual control coordinates point X. The interpolation process starting from various sides in the hypercube HCB results in the same final result.

FIG. 13 exemplifies the above calculation. Designating the orthograph point of the actual control coordinates point px to the line segment DB as "L", as well as designating the orthograph point of the actual control coordinates point px as "KL", the primary intermediate control pattern $P_L$ in the line segment DB side can be calculated by a formula (11) (listed below) in the drawing, and the primary intermediate control pattern $P_K$ in the line segment CA side can be calculated by a formula (12) (listed below) in the same drawing. Finding the secondary intermediate control pattern using the primary intermediate control pattern $P_L$ and $P_K$ designating the actual control coordinate X that exists on the line segment KL can lead to a geometrical understanding that the combined control pattern Px can be obtained by the formula (13). The formula (17) (listed below), which can be obtained from the formulae (13) and (16) (listed below, shows the result in which Px is represented by ξa and ηa.

The above explained formulae are as follows:

$$P_L = \frac{DL}{DB}\cdot P_b + \frac{LB}{DB}\cdot P_d \quad (11)$$

$$P_k = \frac{DL}{DB}\cdot P_a + \frac{LB}{DB}\cdot P_c \quad (12)$$

-continued $$P_x = \frac{DN}{CD}\cdot P_k + \frac{NC}{CD}\cdot P_L \quad (13)$$
$$= \frac{DN}{CD}\left(\frac{DL}{DB}\cdot P_a + \frac{LB}{DB}\cdot P_c\right) + \frac{NC}{CD}\left(\frac{DL}{DB}\cdot P_b + \frac{LB}{DB}\cdot P_d\right)$$
$$= \frac{1}{S_o}(S_a\cdot P_a + S_b\cdot P_b\cdot S_c + S_d\cdot P_d)$$

In this formula, a substitution of $$\left.\begin{array}{l} S_o \equiv CD\cdot DB \\ S_a \equiv DN\cdot DL \quad S_b \equiv NC\cdot DL \\ S_c \equiv DN\cdot LB \quad S_d \equiv NC\cdot LB \end{array}\right\} \quad (14)$$

and $$\left.\begin{array}{l} \xi'_x \equiv \xi_x - \xi_a \\ \eta'_y \equiv \eta_y - \eta_a \end{array}\right\}, \quad (15)$$

provides $$\left.\begin{array}{ll} S_o = \Delta\xi\cdot\Delta\eta & \\ S_a = (\Delta\xi - \xi'_x)(\Delta\eta - \eta'_y) & S_b = \xi'_x\cdot(\Delta\eta - \eta'_y) \\ S_c = \eta'_y\cdot(\Delta\xi - \xi'_x) & S_d = \xi'_x\cdot\eta'_y \end{array}\right\}. \quad (16)$$

Accordingly, from the formulae (13) and (16), $$P_x = \frac{1}{\Delta\xi\cdot\Delta\eta}\{(\Delta\xi - \xi'_x)(\Delta\eta - \eta'_y)\cdot P_a + \quad (17)$$
$$\xi'_x\cdot(\Delta\eta - \eta'_y)\cdot P_b + \eta'_y\cdot(\Delta\xi - \xi'_x)\cdot P_c + \xi'_x\cdot\eta'_y\cdot P_d$$

is provided.

As shown in FIG. 3, a total of three pattern combination processes (two dimensions in degree) were required in order to combine the combined control patterns Px of the actual control coordinate point X in the rectangle HCB, including the combination processes on the line segments CA, DB and KL. When this is extended to a case of M=3, a third intermediate control pattern is obtained by performing the two-dimensional combination processes on two rectangles opposing to each other in the rectangular solid HCB and combining the secondary intermediate control patterns for both rectangles using the actual control coordinate point X in the rectangular solid HCB as an equinoctial point. This can lead to the final combined control pattern Px. The number of pattern combination processes is seven (3 times 2 plus 1).

In the case of M=4, the final combined control pattern Px can be obtained by performing the pattern combination process of M=1 in two series having the actual control coordinate point X between them, and by combining the results thereof by designating the point X as the equinoctial point. Thus, designation of the number of pattern combination processes as Qn as M=N, and designation of that of the pattern combination processes as Qn−1 for M=n−1 can result in a recurrence formula of "$Q_n=2Q_{n-1}+1, Q_2=4$".

Finding this formula results in "$Q_n=2^{n-1}+1$". That is, an application of the hypercube as the unit cell in the M-dimensional input space requires $2^M-1$ times of pattern combination processes in order to obtain the combined control pattern Px. This teaches that M=2 results in three times, and M=3 results in seven times, which corresponds to the above mentioned results.

When the dimension number of the M-dimensional input space is large, that is, when the first type of input variables have to be prepared, the experimental preparation of the two dimension diagram patterns needed for the model control patterns provides, as the combined control pattern Px, the two dimension diagram patterns corresponding to the present values of the first type of input variables, using $2^M-1$ times of processes. In particular, if the two dimension diagram patterns are determined by a limited number of handling points, each combination process can be replaced by the linear interpolation calculation of the handling points coordinates. With such calculation, the number of times of calculation for determining the combined control patterns Px, even when a large number such as M−20 of variables are represented, can result in nearly $(2^{20}-1) \times 10 = 10.5 \times 10^6$ times on the assumption that ten handling points are designated in total on the single two-dimensional diagram pattern. Calculation load on this calculation processes is much less than the image morphing processes that morph multimillions of color pixels or than the conventional means that optimizes a multivariate control system having twenty variables (for example, liner programming or quadratic programming).

Replacing the air quantity α with the air blow temperature can result in the same output set value, using the same technique. In such a case, the already described air quantity α is a parameter corresponding to the air blow temperature or its primary, and it can be replaced by the angular position γ of the air mix damper 3 shown in FIG. 1. The model control pattern is represented by a diagram pattern that shows the relation between the temperature deviation β and the angular position. As shown in FIG. 3B, the control data memory 170 memorizes the diagram patterns PRi (≡R1 to R30) in corresponding with each model coordinate point pi≡(ξi, ηi).

The present invention can be applied to electronics device controllers other than the air conditioner. The number M of first type of input variables can be set to three or more. In this case, the model control patterns are prepared in a mapping form on the three-dimension or more partial input space, and a combined control pattern is obtained by completing polymorphing of four or more model control patterns. Further, the number (N−M) of the second type of input variables can be set to two or more. In this case, the control pattern space is given as a three or more dimension space, and the control pattern line shape is prepared as a curved surface in this space.

While the present invention has been disclosed in terms of the preferred embodiments in order to facilitate better understanding thereof, it should be appreciated that the invention can be embodied in various ways without departing from the principle of the invention.

What is claimed is:

1. A method for controlling an air conditioner provided with a room air sensor that senses a room air temperature, an ambient air sensor that senses an ambient air sensor that senses an ambient air temperature, a solar sensor that senses a solar radiation quantity, an air quantity switch used to set a quantity of air blowing from the air conditioner, and a temperature switch used to set a temperature of the air blowing from the air conditioner, wherein the air conditioner is controlled by referring to at least N pieces (N≧2) of mandatory input variables, and by calculating a value of a defined single output variable based on the mandatory input variables, wherein the mandatory input variables include fixed first type of input variables including the ambient air temperature from the ambient air sensor and the solar radiation quantity from the solar sensor, and remaining second type of input variables including a temperature deviation value obtained based on the temperatures of both the room air sensor and the ambient air sensor and the temperature set by using the temperature switch, the first type of input variables having M (1<M<N) pieces, the second type of input variables having (N−M) pieces, each of the first type of input variables and the second type of input variables having different types of input variables, the single output variable being the quantity of air blowing from the air conditioner in response to the air quantity switch or the temperature of the air blowing from the air conditioner in response to the temperature switch, the method comprising:

separately preparing a plurality of model control patterns for defining a relation between the second type of input variables having (N−M) pieces and a value of the output variable, for determining the value of the output variable according to the mandatory input variable values, the patterns are defined on each of model coordinates in predetermined Q pieces (Q>2) on a M-dimensional input space extended by the first type of input variables;

appointing coordinates in the M-dimensional input space of the first type of input variables included in N-dimensional input values as actual control coordinates, when the N-dimensional input values of the mandatory input variables are provided;

defining J pieces (2<J<Q) in model coordinates as morphing coordinates, the J pieces being present in a predetermined morphing-objective space which includes actual control coordinates point in a M-dimensional input space;

forming combined control patterns corresponding to the actual control coordinates point by morphing a shape of the model control patterns having J pieces and corresponding to each morphing coordinates, the morphing is performed according to weight between the morphing coordinates in the M-dimensional input space and the actual control coordinates, in the control pattern space extended by the second type of input variables and the output variable; and calculating the value of the output variable corresponding to the N-dimensional input values based on the combined control patterns; and controlling the air conditioner based on the calculated value of the output variable.

2. The method according to claim 1, wherein the M pieces of the first type of input variables is two or more in number;

adjacent model coordinates are frame connected with one another in the M-dimensional input space, thereby a plurality of unit cells are disposed so as to tightly section the M-dimensional input space by appointing vertexes as the model coordinates;

a unit cell among other cells including the actual control coordinates point is appointed as the morphing-objective space; and the vertexes of the unit cells forming the model coordinates are used as the morphing coordinates.

3. The method according to claim 2, wherein the unit cell is simplex having M+1 pieces of vertexes, each vertex is the model coordinates point.

4. The method according to claim 3, wherein the hypercube is cut at planes having M pieces parallel to each plane through the actual control coordinates point, thereby sectioning into partial rectangular solids having $2^M$ pieces, each piece exclusively taking one piece of the model coordinates, the model coordinates forming the vertexes of the hypercube; and the relative volume of the partial rectangular solid relative to the hypercube is designated as weight relative to the model coordinates to perform morphing, the model coordinates being positioned on an opposed side against the diagonal direction of the hypercube of the model coordinates, the model coordinates being included in the partial rectangular solid.

5. The method according to claim 4, wherein
the (N−M) pieces of the second type of input variables is one in number, the model control patterns and the combined control patterns are drawn in a two dimension drawing pattern in the control pattern surface as the control pattern space, the control pattern space is extended by the single second type of input variables and the output variable.

6. The method according to claim 5, wherein the two dimension drawing pattern is formed by a certain number of handling points disposed from a pattern starting point toward a pattern terminal point;
each of the handling points of the two dimension drawing pattern corresponding to the all of the model coordinates primarily corresponds with each other according to a disposition order thereof;
combined handling points are formed by morphing corresponding handling points of the two dimension drawing pattern in the morphing coordinates with each other; and
the two dimension drawing pattern forming the combined control pattern is defined by the combined handling points.

7. The method according to claim 6, wherein the two dimension drawing pattern forms a broken curve pattern given by connecting the handling points in series.

8. The method according to claim 7, wherein
the mandatory input variables include all of the ambient air temperature, the solar radiation quantity and the temperature deviation value;
the M-dimensional input space is a two dimension coordinates plane extended by the ambient air temperature and the solar radiation quantity;
the model control pattern is independently prepared as the two dimension drawing pattern showing the relation between the temperature deviation value and the quantity or the temperature of the blowing air by corresponding to the plurality of the model coordinates on the two dimension coordinates plane; and
the combined control pattern is the two dimension drawing pattern formed by morphing the two dimension drawing pattern which forms the model control pattern.

9. A method for controlling an air conditioner provided with a room air sensor that senses a room air temperature, an ambient air sensor that senses an ambient air sensor that senses an ambient air temperature, a solar sensor that senses a solar radiation quantity, an air quantity switch used to set a quantity of air blowing from the air conditioner, and a temperature switch used to set a temperature of the air blowing from the air conditioner,
wherein the air conditioner is controlled by referring to at least N pieces (N≧2) of mandatory input variables, and by calculating a value of a defined single output variable based on the mandatory input variables, wherein the mandatory input variables include fixed first type of input variables including the ambient air temperature from the ambient air sensor and the solar radiation quantity from the solar sensor, and remaining second type of input variables including a temperature deviation value obtained based on the temperatures of both the room air sensor and the ambient air sensor and the temperature set by using the temperature switch, the first type of input variables having M (2<M<N) pieces, the second type of input variables having (N−M) pieces, each of the first type of input variables and the second type of input variables having different types of input variables, the single output variable being the quantity of air blowing from the air conditioner in response to the air quantity switch or the temperature of the air blowing from the air conditioner in response to the temperature switch, the method comprising:
separately preparing a plurality of model control patterns for defining a relation between the second type of input variables having (N−M) pieces and the value of the output variable, for determining the value of the output variable according to the mandatory input variable values,
the patterns are defined on each of model coordinates in predetermined Q pieces (Q>2) on a M-dimensional input space extended by the first type of input variables;
appointing coordinates in the M-dimensional input space of the first type of input variables included in N-dimensional input values as actual control coordinates, when the N-dimensional input values of the mandatory input variables are provided; as well as
defining J pieces (2<J<Q) in model coordinates as morphing coordinates, the J pieces is present in a predetermined morphing-objective space which includes actual control coordinates point in a M-dimensional input space;
forming combined control patterns corresponding to the actual control coordinates point by morphing a shape of the model control patterns having J pieces and corresponding to each morphing coordinates, the morphing is performed according to weight between the morphing coordinates in the M-dimensional input space and the actual control coordinates, in the control pattern space extended by the second type of input variables and the output variable;
calculating a value of the output variable corresponding to the N-dimensional input values based on the combined control patterns; and
controlling the air conditioner based on the calculated value of the output variable; wherein
adjacent model coordinates are frame connected with one another in the M-dimensional input space, thereby a plurality of redundant vertex unit cells are disposed so as to tightly section the M-dimensional input space by appointing vertexes as the model coordinates, the unit cell having M+2 pieces of vertexes; and
among the redundant vertex unit cells, ones including the actual control coordinated points are designated as the morphing-objective space, M+2 pieces of the model coordinates forming the vertexes of the redundant vertex units are used as the morphing coordinates.

10. The method according to claim 9, wherein each of the redundant vertex unit cells is an hypercube having $2^M$ pieces of vertexes.

11. The method according to claim 10, wherein a plurality of hypercubes forming the redundant vertex unit cell are set so as to be congruent with each another.

12. The method according to claim 11, wherein the hypercube is cut at planes having M pieces parallel to each plane through the actual control coordinates point, thereby sectioning into partial rectangular solids having $2^M$ pieces, each piece exclusively taking one piece of the model coordinates, the model coordinates forming the vertexes of the hypercube; and
the relative volume of the partial rectangular solid relative to the hypercube is designated as weight relative to the model coordinates to perform morphing, the model coordinates being positioned on an opposed side against the diagonal direction of the hypercube of the model coordinates, the model coordinates being included in the partial rectangular solid.

13. The method according to claim 12, wherein
the (N−M) pieces of the second type of input variables is one in number, the model control patterns and the combined control patterns are drawn in a two dimension drawing pattern in the control pattern surface as the control pattern space, the control pattern space is extended by the single second type of input variables and the output variable.

14. The equipment control method according to claim 13, wherein the two dimension drawing pattern is formed by a certain number of handling points disposed from a pattern starting point toward a pattern terminal point;
each of the handling points of the two dimension drawing pattern corresponding to the all of the model coordinates primarily corresponds with each other according to a disposition order thereof;
combined handling points are formed by morphing corresponding handling points of the two dimension drawing pattern in the morphing coordinates with each other; and
the two dimension drawing pattern forming the combined control pattern is defined by the combined handling points.

15. The method according to claim 14, wherein the two dimension drawing pattern forms a broken curve pattern given by connecting the handling points in series.

16. The method according to claim 15, wherein the equipment is an air conditioner;
the mandatory input variables include two or more of the ambient air temperature, the solar radiation quantity and the temperature deviation value; and
the output variable is either the quantity or the temperature of blowing air.

17. The method according to claim 16, wherein
the mandatory input variables include all of the ambient air temperature, the solar radiation quantity and the temperature deviation value;
the M-dimensional input space is a two dimension coordinates plane extended by the ambient air temperature and the solar radiation quantity;
the model control pattern is independently prepared as the two dimension drawing pattern showing the relation between the temperature deviation value and the quantity or the temperature of the blowing air by corresponding to the plurality of the model coordinates on the two dimension coordinates plane; and
the combined control pattern is the two dimension drawing pattern formed by morphing the two dimension drawing pattern which forms the model control pattern.

18. A control device for controlling an air conditioner provided with a room air sensor that senses a room air temperature, an ambient air sensor that senses an ambient air sensor that senses an ambient air temperature, a solar sensor that senses a solar radiation quantity, an air quantity switch used to set a quantity of air blowing from the air conditioner, and a temperature switch used to set a temperature of the air blowing from the air conditioner,
wherein the air conditioner is controlled by referring to at least N pieces (N≧2) of mandatory input variables, and by calculating a value of a defined single output variable based on the mandatory input variables, wherein the mandatory input variables include fixed first type of input variables including the ambient air temperature from the ambient air sensor and the solar radiation quantity from the solar sensor, and remaining second type of input variables including a temperature deviation value obtained based on the temperatures of both the room air sensor and the ambient air sensor and the temperature set by using the temperature switch, the first type of input variables having M (1<M<N) pieces, the second type of input variables having (N−M) pieces, each of the first type of input variables and the second type of input variables having different types of input variables, the single output variable being the quantity of air blowing from the air conditioner in response to the air quantity switch or the temperature of the air blowing from the air conditioner in response to the temperature switch
the device comprising:
a control feature information memory means for separately preparing a plurality of model control patterns for defining a relation between the second type of input variables having (N−M) pieces and a value of the output variable values, for determining the value of the output variable according to the mandatory input variable values,
the patterns are defined on each of model coordinates in predetermined Q pieces (Q>2) on a M-dimensional input space extended by the first type of input variables;
a morphing coordinates means for appointing coordinates in the M-dimensional input space of the first type of input variables included in N-dimensional input values as actual control coordinates, when the N-dimensional input values of the mandatory input variables are provided, and defining J pieces (2<J<Q) in model coordinates as morphing coordinates, the J pieces is being present in a predetermined morphing-objective space which includes actual control coordinates point in an M-dimensional input space;
a control pattern morphing means for forming combined control patterns corresponding to the actual control coordinates point by morphing a shape of the model control patterns having the J pieces and corresponding to each morphing coordinates, the morphing is performed according to weight between the morphing coordinates in the M-dimensional input space and the actual control coordinates, in the control pattern space extended by the second type of input variables and the output variable; and
an output variable calculation means for calculating the value of output variable corresponding to the N-dimensional input values based on the combined control patterns; and
a controller for controlling the air conditioner based on the calculated value of the output variable.

19. The control device according to claim 18, wherein
the mandatory input variables include two or more of the ambient air temperature, the solar radiation quantity and the temperature deviation value; and
the output variable is either the quantity or temperature of blowing air.

20. An equipment control method for controlling equipment by referring to at least N pieces (N≧2) of mandatory input variables, and by calculating a value of a defined single output variable based on the mandatory input variables, wherein the mandatory input variables include fixed first type of input variables and remaining second type of input variables, the first type of input variables having M (1<M<N) pieces, the second type of input variables having (N−M) pieces, each of the first type of input variables and the second type of input variables having different types of input variables, the method comprising the steps of:

separately preparing a plurality of model control patterns for defining a relation between the second type of input variables having (N−M) pieces and the output variable, for determining the value of the output variable according to the mandatory input variable values, the patterns are defined on each of model coordinates in predetermined Q pieces (Q>2) on a M-dimensional input space extended by the first type of input variables;

appointing coordinates in the M-dimensional input space of the first type of input variables included in N-dimensional input values as actual control coordinates, when the N-dimensional input values of the mandatory input variables are provided;

defining J pieces (2<J<Q) in model coordinates as morphing coordinates, the J pieces being present in a predetermined morphing-objective space which includes actual control coordinates point in a M-dimensional input space;

forming combined control patterns corresponding to the actual control coordinates point by morphing a shape of the model control patterns having J pieces and corresponding to each morphing coordinates, the morphing is performed according to weight between the morphing coordinates in the M-dimensional input space and the actual control coordinates, in the control pattern space extended by the second type of input variables and the output variable; and calculating, using a computer, the value of the output variable corresponding to the N-dimensional input values based on the combined control patterns, wherein the input variables are input variables for the equipment and the single output variable is an output variable for the equipment.

21. An apparatus configured to control an equipment by referring to at least N pieces (N>2) of mandatory input variables, and by calculating a defined single output variable value based on the mandatory input variables, wherein the mandatory input variables include fixed first type of input variables and remaining second type of input variables, the first type of input variables having M (1<M<N) pieces, the second type of input variables having (N−M) pieces, each of the first type of input variables and the second type of input variables having different types of input variables, the apparatus comprising:

a non-transitory computer-readable medium configured to store a plurality of model control patterns for defining a relation between the second type of input variables having (N−M) pieces and the value of the output variable, wherein the patterns are defined on each of model coordinates in predetermined Q pieces (Q>2) on a M-dimensional input space extended by the first type of input variables;

a computer configured to:

determine the value of the output variable according to the mandatory input variable values;

appoint coordinates in the M-dimensional input space of the first type of input variables included in N-dimensional input values as actual control coordinates, when the N-dimensional input values of the mandatory input variables are provided;

define J pieces (2<J<Q) in model coordinates as morphing coordinates, the J pieces being present in a predetermined morphing-objective space which includes actual control coordinates point in an M-dimensional input space;

form combined control patterns corresponding to the actual control coordinates point by morphing a shape of the model control patterns having the J pieces and corresponding to each morphing coordinates, the morphing being performed according to weight between the morphing coordinates in the M-dimensional input space and the actual control coordinates, in the control pattern space extended by the second type of input variables and the output variable; and calculate output variable values corresponding to the N-dimensional input values based on the combined control patterns;

wherein the input variables are input variables for the equipment and the single output variable is an output variable for the equipment.

* * * * *

UNITED STATES PATENT AND TRADEMARK OFFICE
CERTIFICATE OF CORRECTION

| | |
|---|---|
| PATENT NO. | : 8,103,365 B2 |
| APPLICATION NO. | : 12/184538 |
| DATED | : January 24, 2012 |
| INVENTOR(S) | : Tateishi |

It is certified that error appears in the above-identified patent and that said Letters Patent is hereby corrected as shown below:

At col. 17, lines 52-54, please delete the second instance of "an ambient air sensor that senses"

At col. 19, lines 48-50, please delete the second instance of "an ambient air sensor that senses"

At col. 21, lines 56-57, please delete the second instance of "an ambient air sensor that senses"

Signed and Sealed this
Third Day of April, 2012

David J. Kappos
*Director of the United States Patent and Trademark Office*